(12) United States Patent
Yamada et al.

(10) Patent No.: US 7,668,993 B1
(45) Date of Patent: Feb. 23, 2010

(54) SYSTEM AND METHOD FOR DETERMINING THE CONNECTION STATE OF DEVICES CONNECTED TO A BUS

(75) Inventors: Masazumi Yamada, Osaka (JP); Hiroyuki Iitsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1869 days.

(21) Appl. No.: 10/019,927

(22) PCT Filed: Jul. 4, 2000

(86) PCT No.: PCT/JP00/04421

§ 371 (c)(1),
(2), (4) Date: May 1, 2002

(87) PCT Pub. No.: WO01/03377

PCT Pub. Date: Jan. 11, 2001

(30) Foreign Application Priority Data

| Jul. 6, 1999 | (JP) | ................................. 11/191250 |
| Sep. 6, 1999 | (JP) | ................................. 11/251134 |
| Nov. 19, 1999 | (JP) | ................................. 11/329517 |

(51) Int. Cl.
*G06F 13/42* (2006.01)
*G06F 3/00* (2006.01)

(52) U.S. Cl. .................... 710/106; 710/15; 710/19; 710/105

(58) Field of Classification Search .............. 710/3, 710/8, 15–16, 19, 62, 72, 105–106, 305; 709/224, 228
See application file for complete search history.

(56) References Cited

U.S. PATENT DOCUMENTS

| 5,883,621 | A | 3/1999 | Iwamura | |
| 6,282,597 | B1* | 8/2001 | Kawamura | 710/105 |
| 6,493,769 | B1* | 12/2002 | Kawamura et al. | 710/3 |
| 6,631,426 | B1* | 10/2003 | Staats | 710/9 |
| 6,810,199 | B1* | 10/2004 | Horiguchi et al. | 386/83 |
| 6,813,659 | B1* | 11/2004 | Osakabe et al. | 710/62 |
| 7,240,113 | B1* | 7/2007 | Barry et al. | 709/225 |

FOREIGN PATENT DOCUMENTS

| EP | 0 658 010 A1 | 6/1995 |
| EP | 0 835 029 A2 | 4/1998 |
| EP | 0 859 322 A2 | 8/1998 |

(Continued)

OTHER PUBLICATIONS

"AV/C Disc Subunit General Specification". Version 1.0. Jan. 26, 1999. The 1394 Trade Association. TA Document No. 1998013.*

(Continued)

*Primary Examiner*—Thomas J Cleary
(74) *Attorney, Agent, or Firm*—RatnerPrestia

(57) ABSTRACT

Detecting an input source of a signal of a device connected to a bus and determining whether the signal is converted, extracted, multiplexed, or processed. Efficiently controlling the connection of each unit connected on the bus. Issuing a command for detecting the output plug or source plug as the signal source. The unit or subunit receiving this command shows the signal source. Obtaining information showing whether a subunit is present in the unit or not.

8 Claims, 33 Drawing Sheets

FOREIGN PATENT DOCUMENTS

| | | |
|---|---|---|
| EP | 1 102 437 A1 | 5/2001 |
| JP | 07222263 | 8/1995 |
| JP | 09-325931 | 12/1997 |
| JP | 10124454 | 5/1998 |
| JP | 10-173689 A | 6/1998 |
| JP | 10164108 | 6/1998 |
| JP | 11177591 | 7/1999 |

OTHER PUBLICATIONS

Japanese International Search Report for PCT/JP00/04421.

Audio/Video Working Group of the 1394 Trade Association, "AV/C Digital Interface Command Set General Specification", Version 3.0, Apr. 15, 1998, vol. 1998003, Austin, TX.

Supplementary European Search Report for EP 00 94 0931, dated Mar. 19, 2008.

* cited by examiner

FIG. 7(a)

| | msb | | | | | | | lsb |
|---|---|---|---|---|---|---|---|---|
| opcode | INTERNAL SIGNAL SOURCE ($26_{16}$) | | | | | | | |
| operand[0] | plug | | | | | | | |
| operand[1] | signal_source_number | | | | | | | |
| operand[2] | $FF_{16}$ | | | | | | | |
| operand[3] | $FF_{16}$ | | | | | | | |
| operand[4] | $FF_{16}$ | | | | | | | |
| operand[5] | $FF_{16}$ | | | | | | | |
| operand[6] | $FF_{16}$ | | | | | | | |
| operand[7] | $FF_{16}$ | | | | | | | |
| operand[8] | $FF_{16}$ | | | | | | | |

FIG. 7(b)

| value | plug |
|---|---|
| $0 - 1E_{16}$ | Serial Bus OPCR[0]-OPCR[30] |
| $1F_{16} - 7E_{16}$ | Reserved |
| $7F_{16}$ | Reserved |
| $80_{16} - 9E_{16}$ | External output plug 0-30 |
| $9F_{16} - 99_{16}$ | Reserved |
| $A0_{16} - BE_{16}$ | Serial Bus Asynchronous output plug[0]-[30] |
| $BF_{16}$ | Reserved |
| $C0_{16} - FD_{16}$ | Reserved |
| $FE_{16}$ | Reserved |
| $FF_{16}$ | Reserved |

FIG. 7C

| value | plug |
|---|---|
| $0 - 1E_{16}$ | Destination plug 0-30 |
| $1F_{16} - FD_{16}$ | Reserved |
| $FE_{16}$ | Reserved |
| $FF_{16}$ | Reserved |

FIG. 8(a)

| | msb | | | | | | | lsb |
|---|---|---|---|---|---|---|---|---|
| opcode | INTERNAL SIGNAL SOURCE ($26_{16}$) | | | | | | | |
| operand[0] | plug | | | | | | | |
| operand[1] | signal_source_number | | | | | | | |
| operand[2] | total_signal_source | | | | | | | |
| operand[3] | $FF_{16}$ | | | | | | | |
| operand[4] | signal_source_plug | | | | | | | |
| operand[5] | data type | 11 | external_input_type | | | | | |
| operand[6] | $FF_{16}$ | | | | | | | |
| operand[7] | $FF_{16}$ | | | | | | | |
| operand[8] | $FF_{16}$ | | | | | | | |

852 — operand[0]–operand[2]
854 — operand[3]–operand[5]
856 — operand[6]–operand[8]

FIG. 8(b)

| | data type |
|---|---|
| 00 | No information |
| 01 | Video |
| 10 | Audio |
| 11 | Audio/Video |

FIG. 8(c)

| | plug type |
|---|---|
| $0-1E_{16}$ | Serial Bus 1PCR[0]-1PCR[30] |
| $1F_{16}-7E_{16}$ | Reserved |
| $7F_{16}$ | Reserved |
| $80_{16}-9E_{16}$ | External input plug 0-30 |
| $9F_{16}-99_{16}$ | Reserved |
| $A0_{16}-BE_{16}$ | Serial Bus Asynchronous input plug[0]-[30] |
| $BF_{16}$ | Reserved |
| $C0_{16}-FD_{16}$ | Reserved |
| $FE_{16}$ | Reserved |
| $FF_{16}$ | Reserved |

FIG. 8(d)

| | external plug type |
|---|---|
| 0000 | analogue |
| 0001 | SCART |
| 0010-0110 | reserved |
| 0111 | antenna |
| 1000 | IEC958()coaxial |
| 1001 | IEC958(optical) |
| 1010-1110 | reserved |
| 1111 | (Serial Bus or Async) |

FIG. 9(a)

| | msb | | | | | | | | lsb |
|---|---|---|---|---|---|---|---|---|---|
| opcode | INTERNAL_SIGNAL_SOURCE($26_{16}$) | | | | | | | | |
| operand[0] | plug | | | | | | | | |
| operand[1] | signal_source_number | | | | | | | | |
| operand[2] | total_signal_source | | | | | | | | |
| operand[3] | subunit type | | | | | subunit ID | | | |
| operand[4] | signal source plug($0-1E_{16}$) | | | | | | | | |
| operand[5] | data type | | | | | $3F_{16}$ | | | |
| operand[6] | $FF_{16}$ | | | | | | | | |
| operand[7] | $FF_{16}$ | | | | | | | | |
| operand[8] | $FF_{16}$ | | | | | | | | | operand[0] = 952
operand[1]-operand[2] = 954
operand[3]-operand[8] = 956

FIG. 9(b)

| value | plug |
|---|---|
| $0-1E_{16}$ | Source plug 0-30 |

FIG. 10(a)

| | msb | | | | | | | lsb | |
|---|---|---|---|---|---|---|---|---|---|
| opcode | INTERNAL_SIGNAL_SOURCE (26₁₆) | | | | | | | | |
| operand[0] | plug (0-1E₁₆) | | | | | | | | |
| operand[1] | signal_source_number | | | | | | | | |
| operand[2] | total_signal_source | | | | | | | | |
| operand[3] | FF₁₆ | | | | | | | | |
| operand[4] | signal_source_plug | | | | | | | | |
| operand[5] | data type | | | | 11 | external plug type | | | |
| operand[6] | 00 | | | | IEEE1394 isochoronous channel | | | | |
| operand[7] | output status | | | | F₁₆ | | | | |
| operand[8] | FF₁₆ | | | | | | | | |

| | msb | | | | | | | lsb | |
|---|---|---|---|---|---|---|---|---|---|
| opcode | INTERNAL_SIGNAL_SOURCE (26₁₆) | | | | | | | | |
| operand[0] | plug (0-1E₁₆) | | | | | | | | |
| operand[1] | signal_source_number | | | | | | | | |
| operand[2] | total_signal_source | | | | | | | | |
| operand[3] | subunit type | | | | | subunit ID | | | |
| operand[4] | signal_source_plug | | | | | | | | |
| operand[5] | data type | | | | 3F₁₆ | | | | |
| operand[6] | 00 | | | | IEEE1394 isochronous channel | | | | |
| operand[7] | output status | | | | F₁₆ | | | | |
| operand[8] | FF₁₆ | | | | | | | | |

| Value | output_status | IEEE1394 isochorounous channel |
|---|---|---|
| 0000 | Outputting | Channel No. output by device itself |
| 0001 | Virtual outputting | Channel No. output by other devices |
| 0010 | Not outputting | FF₁₆ |
| 0011-1111 | reserved | reserved |

FIG. 11(a)

| | msb | | | | | | | lsb |
|---|---|---|---|---|---|---|---|---|
| opcode | INTERNAL_SIGNAL_SOURCE(26₁₆) | | | | | | | |
| operand[0] | plug(80₁₆-9E₁₆) | | | | | | | |
| operand[1] | signal_source_number | | | | | | | |
| operand[2] | total_signal_source | | | | | | | |
| operand[3] | FF₁₆ | | | | | | | |
| operand[4] | signal_source_plug | | | | | | | |
| operand[5] | data type | | | 11 | | external_input_type | | |
| operand[6] | 01 | | | 11 | | external_output_type | | |
| operand[7] | external_output_status | | | | | | | |
| operand[8] | FF₁₆ | | | | | | | |

| | msb | | | | | | | lsb |
|---|---|---|---|---|---|---|---|---|
| opcode | INTERNAL_SIGNAL_SOURCE(26₁₆) | | | | | | | |
| operand[0] | plug(80₁₆-9E₁₆) | | | | | | | |
| operand[1] | signal_source_number | | | | | | | |
| operand[2] | total_signal_source | | | | | | | |
| operand[3] | FF₁₆ | | | | | | | |
| operand[4] | signal_source_plug | | | | | | | |
| operand[5] | data type | | | 3E₁₆ | | | | |
| operand[6] | 01 | | | 11 | | external_output_type | | |
| operand[7] | external_output_status | | | | | | | |
| operand[8] | FF₁₆ | | | | | | | |

| | external output status |
|---|---|
| 0000 | active |
| 0001 | reserved |
| 0010 | inactive |
| 0011-1111 | reserved |

FIG. 12(a)

| | msb | | | | | | | | lsb | |
|---|---|---|---|---|---|---|---|---|---|---|
| opcode | | | INTERNAL_SIGNAL_SOURCE ($26_{16}$) | | | | | | | |
| operand[0] | | | plug ($A0_{16}$–$BE_{16}$) | | | | | | | ⎫ 1252 |
| operand[1] | | | signal_source_number | | | | | | | |
| operand[2] | | | $FF_{16}$ | | | | | | | |
| operand[3] | | | $FF_{16}$ | | | | | | | ⎫ 1254 |
| operand[4] | | | signal_source_plug | | | | | | | |
| operand[5] | data_type | | | 11 | | | external_input_type | | | |
| operand[6] | | | $FF_{16}$ | | | | | | | |
| operand[7] | async_output_status | | | | | | $F_{16}$ | | | ⎫ 1256 |
| operand[8] | | | $FF_{16}$ | | | | | | | |

FIG. 12(b)

| | msb | | | | | | | | lsb | |
|---|---|---|---|---|---|---|---|---|---|---|
| opcode | | | INTERNAL_SIGNAL_SOURCE ($26_{16}$) | | | | | | | |
| operand[0] | | | plug ($A0_{16}$–$BE_{16}$) | | | | | | | ⎫ 1258 |
| operand[1] | | | signal_source_number | | | | | | | |
| operand[2] | | | $FF_{16}$ | | | | | | | |
| operand[3] | subunit_type | | | | | | subunit ID | | | ⎫ 1260 |
| operand[4] | | | signal_source_plug | | | | | | | |
| operand[5] | data_type | | | $3F_{16}$ | | | | | | |
| operand[6] | | | $FF_{16}$ | | | | | | | |
| operand[7] | async_output_status | | | | | | $F_{16}$ | | | ⎫ 1262 |
| operand[8] | | | $FF_{16}$ | | | | | | | |

FIG. 12(c)

| | async output status |
|---|---|
| 0000 | connected |
| 0001 | reserved |
| 0010 | not connected |
| 0011–1111 | reserved |

FIG. 13(a)

| | msb | | | | | | | | lsb |
|---|---|---|---|---|---|---|---|---|---|
| opcode | INTERNAL_SIGNAL_SOURCE(26₁₆) | | | | | | | | |
| operand[0] | plug | | | | | | | | |
| operand[1] | signal_source_number | | | | | | | | |
| operand[2] | FF₁₆ | | | | | | | | |
| operand[3] | FF₁₆ | | | | | | | | |
| operand[4] | signal_source_plug | | | | | | | | |
| operand[5] | data type | | | | | 3F₁₆ | | | |
| operand[6] | FF₁₆ | | | | | | | | |
| operand[7] | FF₁₆ | | | | | | | | |
| operand[8] | FF₁₆ | | | | | | | | |

(operand[1]–operand[4] bracketed as 1352; operand[5]–operand[8] bracketed as 1354)

FIG. 13(b)

| | msb | | | | | | | | lsb |
|---|---|---|---|---|---|---|---|---|---|
| opcode | INTERNAL_SIGNAL_SOURCE(26₁₆) | | | | | | | | |
| operand[0] | plug | | | | | | | | |
| operand[1] | signal_source_number | | | | | | | | |
| operand[2] | FF₁₆ | | | | | | | | |
| operand[3] | subunit_type | | | | | | | subunit ID | |
| operand[4] | signal_source_plug | | | | | | | | |
| operand[5] | data type | | | | | 3F₁₆ | | | |
| operand[6] | FF₁₆ | | | | | | | | |
| operand[7] | FF₁₆ | | | | | | | | |
| operand[8] | FF₁₆ | | | | | | | | |

(operand[1]–operand[4] bracketed as 1356; operand[5]–operand[8] bracketed as 1358)

FIG. 13(c)

| value | plug type |
|---|---|
| 0–1E₁₆ | Serial Bus iPCR[0]–iPCR[30] |
| 1F₁₆–7E₁₆ | Reserved |
| 7F₁₆ | Any available Serial Bus plug iPCR[x] |
| 80₁₆–9E₁₆ | External input plug 0–30 |
| 9F₁₆–99₁₆ | Reserved |
| A0₁₆–BE₁₆ | Serial Bus Asynchronous input plug[0]–[30] |
| BF₁₆ | Any available Serial Bus Asynchronous input plug |
| C0₁₆–FD₁₆ | Reserved |
| FE₁₆ | Reserved |
| FF₁₆ | Any available External input plug |

FIG. 13(d)

| value | plug |
|---|---|
| 0–1E₁₆ | Source plug 0–30 |
| 1F₁₆–FC₁₆ | Reserved |
| FF₁₆ | Any available source plug |

FIG. 14(a)

| | msb | | | | | | | lsb |
|---|---|---|---|---|---|---|---|---|
| opcode | INTERNAL_SIGNAL_SOURCE (26₁₆) | | | | | | | |
| operand[0] | plug | | | | | | | |
| operand[1] | signal_source_number | | | | | | | |
| operand[2] | FF₁₆ | | | | | | | |
| operand[3] | FF₁₆ | | | | | | | |
| operand[4] | signal_source_plug | | | | | | | |
| operand[5] | data type | | | 3F₁₆ | | | | |
| operand[6] | FF₁₆ | | | | | | | |
| operand[7] | FF₁₆ | | | | | | | |
| operand[8] | FF₁₆ | | | | | | | |

{operand[0]–operand[1]} 1452
{operand[2]–operand[8]} 1454

FIG. 14(b)

| | msb | | | | | | | lsb |
|---|---|---|---|---|---|---|---|---|
| opcode | INTERNAL_SIGNAL_SOURCE (26₁₆) | | | | | | | |
| operand[0] | plug | | | | | | | |
| operand[1] | signal_source_number | | | | | | | |
| operand[2] | FF₁₆ | | | | | | | |
| operand[3] | subunit_type | | | | subunit_ID | | | |
| operand[4] | signal_source_plug | | | | | | | |
| operand[5] | data type | | | 3F₁₆ | | | | |
| operand[6] | FF₁₆ | | | | | | | |
| operand[7] | FF₁₆ | | | | | | | |
| operand[8] | FF₁₆ | | | | | | | |

{operand[3]–operand[4]} 1456
{operand[5]–operand[8]} 1458

FIG. 14(c)

| plug type | |
|---|---|
| 0–1E₁₆ | Serial Bus oPCR[0]–oPCR[30] |
| 1F₁₆–7E₁₆ | Reserved |
| 7F₁₆ | Any available Serial Bus plug oPCR[x] |
| 80₁₆–9E₁₆ | External output plug 0–30 |
| 9F₁₆–99₁₆ | Reserved |
| A0₁₆–BE₁₆ | Serial Bus Asynchronous output plug[0]–[30] |
| BF₁₆ | Any available serial Bus asynchronous output plug[x] |
| C0₁₆–FD₁₆ | Reserved |
| FE₁₆ | Reserved |
| FF₁₆ | Any available external output plug |

FIG. 15(a)

| | msb | | | | | | lsb |
|---|---|---|---|---|---|---|---|
| opcode | \multicolumn{7}{c}{EXTERNAL SIGNAL SOURCE ($27_{16}$)} |
| operand[0] | \multicolumn{7}{c}{plug} |
| operand[1] | \multicolumn{7}{c}{$FF_{16}$} |
| operand[2] | \multicolumn{7}{c}{$FF_{16}$} |
| operand[3] | \multicolumn{7}{c}{$FF_{16}$} |
| operand[4] | \multicolumn{7}{c}{$FF_{16}$} |
| operand[5] | \multicolumn{7}{c}{$FF_{16}$} |
| operand[6] | \multicolumn{7}{c}{$FF_{16}$} |
| operand[7] | \multicolumn{7}{c}{$FF_{16}$} |
| operand[8] | \multicolumn{7}{c}{$FF_{16}$} |

FIG. 15(b)

| value | plug |
|---|---|
| $0 - 1E_{16}$ | Serial Bus iPCR[0]-iPCR[30] |
| $1F_{16} - 7E_{16}$ | Reserved |
| $7F_{16}$ | Reserved |
| $80_{16} - 9E_{16}$ | External input plug 0-30 |
| $9F_{16} - 99_{16}$ | Reserved |
| $A0_{16} - BE_{16}$ | Serial Bus Asynchronous input plug[0]-[30] |
| $BF_{16}$ | Reserved |
| $C0 - FD_{16}$ | Reserved |
| $FE_{16}$ | Reserved |
| $FF_{16}$ | Reserved |

FIG. 16(a)

| | msb | | | | | | lsb | |
|---|---|---|---|---|---|---|---|---|
| opcode | \multicolumn{7}{c|}{EXTERNAL_SIGNAL_SOURCE ($27_{16}$)} | } 1652 |
| operand[0] | \multicolumn{7}{c|}{plug(0-$1E_{16}$)} | |
| operand[1] | \multicolumn{3}{c|}{output_state} | \multicolumn{4}{c|}{$F_{16}$} | } 1654 |
| operand[2] | \multicolumn{2}{c|}{00} | \multicolumn{5}{c|}{IEEE1394 isochronous channel} | |
| operand[3] | \multicolumn{7}{c|}{Node ID of signal source (when unkow,$FF_{16}$)} | |
| operand[4] | \multicolumn{7}{c|}{OPCR of signal source (when unkow,$FE_{16}$)} | |
| operand[5] | | | | | | | | |
| operand[6] | \multicolumn{7}{c|}{EUI-64 of signal source (when unkow,$all_1$)} | } 1654 |
| operand[7] | | | | | | | | |
| operand[8] | | | | | | | | |

| | msb | | | | | | lsb |
|---|---|---|---|---|---|---|---|
| opcode | EXTERNAL_SIGNAL_SOURCE ($27_{16}$) |||||||
| operand[0] | plug(0-$1E_{16}$) |||||||
| operand[1] | output_state ||| $F_{16}$ ||||
| operand[2] | 00 || IEEE1394 isochronous channel |||||
| operand[3] | Node ID of signal source (when unkow,$FF_{16}$) |||||||
| operand[4] | OPCR of signal source (when unkow,$FE_{16}$) |||||||
| operand[5] | EUI-64 of signal source (when unkow,$all_1$) |||||||
| operand[6] | |||||||
| operand[7] | |||||||
| operand[8] | |||||||

| Value | output_status | IEEE1394 isochorounous channel |
|---|---|---|
| 0000 | Outputting | Channel No. output by device itself |
| 0001 | Virtual outputting | Channel No. output by other devices |
| 0010 | Not outputting | $FF_{16}$ |
| 0011-1111 | reserved | reserved |

FIG. 20

| | msb | | | | | | | lsb |
|---|---|---|---|---|---|---|---|---|
| opcode | EXTERNAL_SIGNAL_SOURCE ($27_{16}$) | | | | | | | |
| operand[0] | plug ($80_{16}$-$9E_{16}$) | | | | | | | |
| operand[1] | external_output_state | | | | | $F_{16}$ | | |
| operand[2] | 01 | | 11 | | external_output_type | | | |
| operand[3] | Node_ID of signal source (when no condition, $FF_{16}$) | | | | | | | |
| operand[4] | OPCR of signal source (when no condition, $FE_{16}$) | | | | | | | |
| operand[5] | EUI-64 of signal source (when no condition, all 1) | | | | | | | |
| operand[6] | | | | | | | | |
| operand[7] | | | | | | | | |
| operand[8] | | | | | | | | |

Brace 2052 covers operand[1]–operand[4]; brace 2054 covers operand[5]–operand[8].

FIG. 24

| opcode | SIGNAL SOURCE (28₁₆) | |
|---|---|---|
| operand[0] | FF₁₆ | |
| operand[1] | FF₁₆ | |
| operand[2] | FF₁₆ | |
| operand[3] | signal_destination_subunit_type | signal_destination_subunit_ID |
| operand[4] | signal_destination_plug | |

SIGNAL SOURCE status command format

FIG. 25

| opcode | SIGNAL SOURCE (28₁₆) | | |
|---|---|---|---|
| operand[0] | output_status | conv | connect_status |
| operand[1] | signal_source | | |
| operand[2] | | | |
| operand[3] | signal_destination_subunit_type | | signal_destination_subunit_ID |
| operand[4] | signal_destination_plug | | |

SIGNAL SOURCE status response format

FIG. 26(a)

| value | output_status |
|---|---|
| 0000 | effective packet output |
| 0001 | not effective |
| 0010 | insufficient resource |
| 0011 | ready |
| 0100 | virtual output |
| 0101-1111 | reserved |

FIG. 26(b)

| value | connect_status |
|---|---|
| 000 | normal |
| 001 | through |
| 010 | modified |
| 011 | OSD |
| 100 | converted |
| 101-110 | reserved |
| 111 | (not used) |

FIG. 28

| | msb | | | | | | lsb |
|---|---|---|---|---|---|---|---|
| opcode | | | SIGNAL SOURCE ($28_{16}$) | | | | |
| operand[0] | | | $FF_{16}$ | | | | |
| operand[1] | | | signal_source | | | | |
| operand[2] | | | | | | | |
| operand[3] | | signal_destination_subunit_type | | | signal_destination_subunit_ID | | |
| operand[4] | | | signal_destination_plug | | | | |

SIGNAL SOURCE control command format

FIG. 29

| | msb | | | | | | lsb |
|---|---|---|---|---|---|---|---|
| opcode | | | SIGNAL SOURCE ($28_{16}$) | | | | |
| operand[0] | | reserved | | | | connect_status | |
| operand[1] | | | signal_source | | | | |
| operand[2] | | | | | | | |
| operand[3] | | signal_destination_subunit_type | | | signal_destination_subunit_ID | | |
| operand[4] | | | signal_destination_plug | | | | |

SIGNAL SOURCE control response format

FIG. 31

| | msb | | | | | | | lsb |
|---|---|---|---|---|---|---|---|---|
| opcode | \multicolumn{8}{c|}{INPUT SELECT ($27_{16}$)} |
| operand[0] | plug | | | | | | | |
| operand[1] | 0000 | | | | level | | | |
| operand[2] | status | | | | | | | |
| operand[3] | input_type | | | | | | | |
| operand[4] | reserved (all 0) | | | | | | | |
| operand[5] | connected node_ID | | | | | | | |
| operand[6] | | | | | | | | |
| operand[7] | connected plug_ID | | | | | | | |
| operand[8] | reserved (all 0) | | | | | | | |

FIG. 32

| value | level | meaning |
|---|---|---|
| 0000 | Level0 | If ready, establish connection |
| 0001 | Level1 | If broad cast input only, establish connection, even if stopping it |
| 0010 | Level2 | Establish connection, even if stopping p-to-p (Target established) |
| 0011-1111 | reserved | |

FIG. 33

| value | input_type |
|---|---|
| 00 - 3F₁₆ | Isochronous channel to input |
| 40₁₆ | any available isochronous channel |
| 41-FF₁₆ | reserved |

FIG. 34

| value | meaning | return | iPCR |
|---|---|---|---|
| 0000 | Ready | ACCEPTED | active |
| 0001 | Receiving another broadcast input | REJECTED | active |
| 0010 | Inputting another p-to-p Input (owner) | REJECTED | active |
| 0100 | Inputting another p-to-p Input (not owner) | REJECTED* | active |
| 0101 | Band width, ch are not taken | REJECTED* | idle, ready, suspended |
| 0110 | No node, plug of partner | REJECTED* | - |
| 0111 | No internal connection in iPCR | REJECTED* | idle, ready, suspended |
| 1000-1100 | reserved | - | |
| 1110 | Any other reason | REJECTED | - |
| 1111- | reserved | - | - |

FIG. 37(a) PRIOR ART

| | msb | | | | | | | lsb |
|---|---|---|---|---|---|---|---|---|
| opcode | CONNECT ($24_{16}$) | | | | | | | |
| operand[0] | $3F_{16}$ | | | | | | lock | perm |
| operand[1] | source_subunit_type | | | | source_subunit_ID | | | |
| operand[2] | source_plug | | | | | | | |
| operand[3] | destination_subunit_type | | | | destination_subunit_ID | | | |
| operand[4] | destination_plug | | | | | | | |

FIG. 37(b) PRIOR ART

| | msb | | | | | | | lsb |
|---|---|---|---|---|---|---|---|---|
| opcode | CONNECT ($24_{16}$) | | | | | | | |
| operand[0] | $FF_{16}$ | | | | | | | |
| operand[1] | $FF_{16}$ | | | | | | | |
| operand[2] | $FE_{16}$ | | | | | | | |
| operand[3] | destination_subunit_type | | | | destination_subunit_ID | | | |
| operand[4] | destination_plug | | | | | | | |

SYSTEM AND METHOD FOR DETERMINING THE CONNECTION STATE OF DEVICES CONNECTED TO A BUS

CROSS-RELATED APPLICATIONS

This application is a U.S. National Phase Application of PCT International Application PCT/JP00/04421.

TECHNICAL FIELD

The present invention relates to a device control method for controlling plural devices connected to a bus, and a program recording medium recording the same method.

BACKGROUND ART

In the recent trend of digital technology in a digital video recorder and communication satellite broadcast, it is attempted to control devices using digital technology by connecting to one network.

In such a network, the IEEE1394 interface is expected to be used widely in the future as a digital interface excellent in universality owing to the following reasons.

1) Signals can be transmitted between arbitrary devices regardless of form of their connection.

2) Live wires of cables used in connection can be inserted and removed.

3) Both isochronous data, which is realtime data such as audio-video (AV) signals, and asynchronous data, which is non-realtime data such as commands for devices, can be transmitted simultaneously. It is hence easy to use for the personal computer (PC) and its related devices.

FIG. 36 shows an example of configuration of system operating by using the IEEE1394 interface.

As shown in FIG. 36, a set top box (STB) 600, a VHS digital video tape recorder unit (D-VHS) 700, and a television receiver (TV) 800 are connected to an IEEE1394 bus 900 having plural channels. These devices constitute one system controllable as a logical unit.

The STB 600 includes a tuner which is not shown in the drawing. The D-VHS 700 includes a video cassette recorder (VCR) and a tuner, neither shown. The TV 800 includes a monitor and a tuner, neither shown.

Herein, the tuner, VCR and monitor are controlled as subunits in each unit.

The unit and subunit have plugs for exchanging signal input and output.

In the unit, the following plugs are defined.

1) Plugs for input: a) digital input plug, b) external input plug, c) digital asynchronous input plug.

2) Plugs for output: a) digital output plug, b) external output plug, c) digital asynchronous output plug.

In the subunit, the following plugs are defined.

1) Plug for input: destination plug.

2) Plug for output: source plug.

When building a system connecting plural devices by using such IEEE1394 interface, it is important to set the connection state of plural units, including connection with the subunit in the unit, in particular, the signal source to the intended plug, and to know the signal source.

For knowing or setting the connection state between subunits, as shown in FIG. 37, it is necessary to exchange "Connect control command" and "Connect status command." These commands are defined in "AV/C Digital Interface Command Set General Specification, Version 3.0. TA document number 1998003." The commands includes a status command for inquiring a plug connected to a designated plug, a control command for connecting two designated plugs, and others.

In particular, in the case that multiple subunits are present on a signal path between the intended plug and the output source of the signal, if the device is controlled by using these commands, there are too many commands to be exchanged. Therefore, many steps are needed in order to control the system.

Further, when making protected connection of signals between two specific units, the point-to-point connection is employed. Hitherto, in the IEEE1394, it is designed to cut off the connection only in the unit established in connection.

SUMMARY OF THE INVENTION

It is hence an object of the invention to present a device control method capable of knowing the input source of the signal immediately, by omitting the procedure of minute checking of internal connection state of each device connected to a bus, and setting the signal source and controlling the devices.

It is another object of the invention, in addition to the above, to present a device control method capable of knowing easily if processing such as conversion, extraction, or multiplexing in the midst of transmission of the signal from the input source has been executed or not in a subunit existing on a signal path.

It is a further object of the invention to present a device control method capable of controlling connection of each unit connected to a bus efficiently, in point-to-point connection, by presenting a method of cutting off the connection when the connection is established by the transmission side or third party and the signal received at the reception side is no longer necessary.

To achieve these objects, the invention provides a system configured by connecting units having subunits to a bus, in which a command for detecting the output plug as the signal source or the source plug is issued to a unit connected to the bus or a subunit included in this unit. The signal source is known from the result of detection indicated by the response issued from the first unit or its subunit receiving the command. The invention further includes a step of obtaining the information showing whether a subunit is present or not on a path from the output plug as the signal source obtained as a result of detection or a source plug, to an input plug of a specific unit or a destination plug of a subunit in this unit, and whether the signal is processed or not on the way.

The invention also presents a method for cutting off and establishing the connection with other units from a unit at the reception side.

In these methods, the commands and responses newly defined in the invention are employed.

BRIEF DESCRIPTION OF THE DRAWINGS

FIG. 7 shows a composition of a "command for inquiring the signal source to the unit or subunit" used in the invention, in which (a) shows an INTERNAL SIGNAL SOURCE status command, (b) shows the contents of plug field for designating the type of plug at the inquiry destination in the case of Unit Command, and (c) shows the same in the case of subunit command.

FIG. 8 shows a composition of a "response from a subunit when the signal source is an input plug, to a command for inquiring the signal source to the subunit" used in the invention, in which (a) shows a response, (b) shows a data type, that is, type of data of signal source, (c) shows a signal source plug, that is, type of plug of signal source, and (d) shows an external input type, that is, the contents of each field of response in (a) of the type of external input plug.

FIG. 9 shows a composition of a "response from a subunit when the signal source is a source plug, to a command for inquiring the signal source to the subunit" used in the invention, in which (a) shows a response, and (b) shows the contents of signal source plug of the response.

FIG. 10 shows a composition of a "response from a unit of inquiry about a digital output plug to a command for inquiring the signal source to the unit" used in the invention, in which (a) shows a response when the signal source is an input plug, (b) shows a response when the signal source is a source plug, and (c) shows the contents of output status of the response, that is, the output state of the plug.

FIG. 11 shows a composition of a "response from a unit to a command for inquiring the signal source to an external output plug of the unit" used in the invention, in which (a) shows a response when the signal source is an input plug, (b) shows a response when the signal source is a source plug, and (c) shows the contents of external output status of the response, that is, the output state of the external plug.

FIG. 12 shows a composition of a "response from a unit to a command for inquiring the signal source to an asynchronous output plug of the unit" used in the invention, in which (a) shows a response when the signal source is an input plug, (b) shows a response when the signal source is a source plug, and (c) shows the contents of async_output_status of the response, that is, the state of the asynchronous plug.

FIG. 13 shows a composition of a "command for designating the signal source of a subunit" used in the invention, in which (a) shows a command when designating an input plug as the signal source, (b) shows a command when designating a source plug as the signal source, (c) shows the contents of the signal source plug of the command of (a), and (d) shows the contents of the signal source plug of the command of (b).

FIG. 14 shows a composition of a "command for designating the signal source of a unit" used in the invention, in which (a) shows a command when designating an input plug as the signal source, (b) shows a command when designating a source plug as the signal source, and (c) shows the contents of the plug of the command of (a).

FIG. 15 shows a composition of a "command for inquiring the signal source (output plug of unit) to an input plug of a unit" used in the invention, in which (a) shows a command of External Signal Source Status, and (b) shows the content of the plug of the command.

FIG. 16 shows a composition of a "response to a command for inquiring the signal source to a digital output plug" used in the invention, in which (a) shows a status command of external signal terminal status, and (b) shows an output status, that is, the output state of the signal source in the plug.

FIG. 20 shows a composition of a "command for setting the designated external output plug in the external input plug of the target unit of the command as the signal source" used in the invention.

FIG. 24 shows the contents of SIGNAL SOURCE status command.

FIG. 25 shows the contents of response to SIGNAL SOURCE status command.

FIG. 26 shows the contents of response to SIGNAL SOURCE status command in FIG. 25, in which (a) shows the contents of output_status field, and (b) shows the contents of connected_status field.

FIG. 28 shows the contents of SIGNAL SOURCE control command.

FIG. 29 shows the contents of response to SIGNAL SOURCE control command.

FIG. 31 shows the contents of INPUT SELECT command.

FIG. 32 shows the contents of level field of the command in FIG. 31.

FIG. 33 shows the contents of input_type field of the command in FIG. 31.

FIG. 34 shows the contents of status field in the response to INPUT SELECT command in FIG. 31.

FIG. 37 shows a composition of CONNECT command in the prior art, in which (a) shows a connect control command, and (b) shows a connect status command for destination plug.

DETAILED DESCRIPTION OF THE PREFERRED EMBODIMENTS

Preferred embodiments of the invention are explained below.

Throughout the embodiments explained in the specification, the devices are handled as units and subunits.

The embodiments of the invention are explained below by referring to FIGS. 1, 7, 8, 10, 11, 15, and 16.

Embodiment 1

Figure 1:
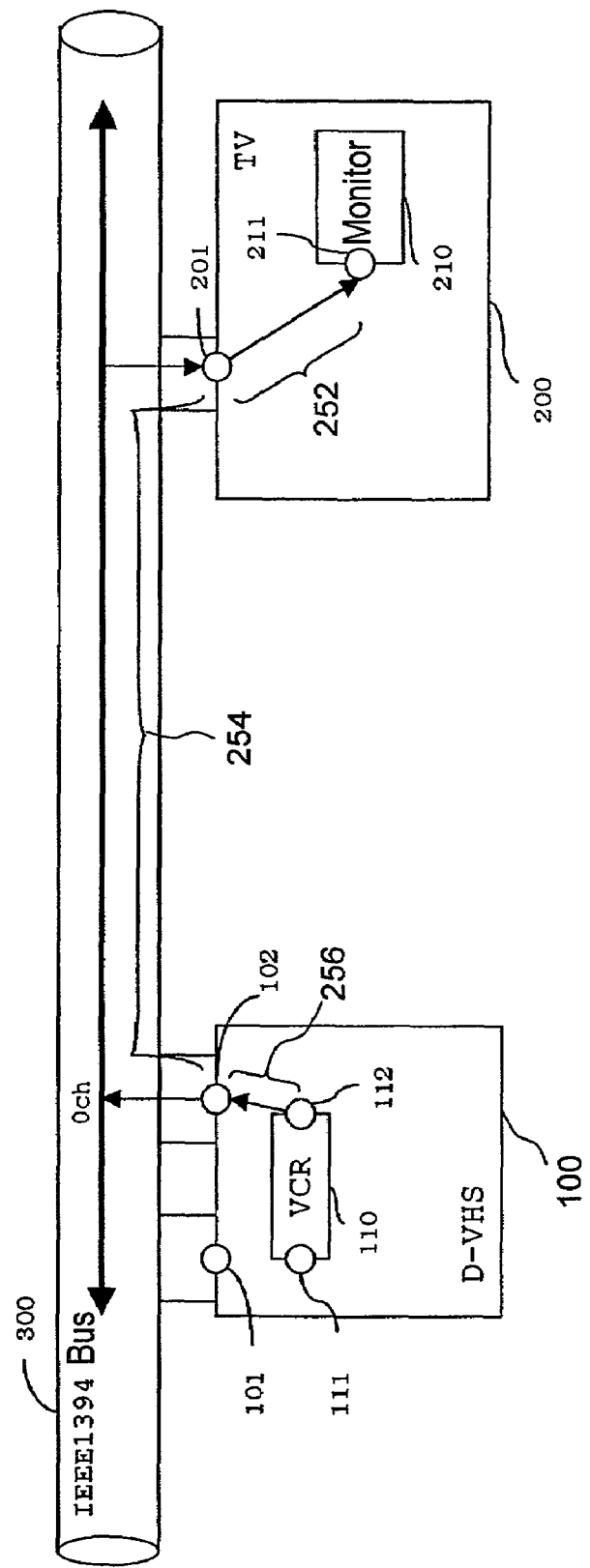
FIG. 1 shows a configuration of a system operating by using a device control method in embodiment 1 of the invention.

As shown in FIG. 1, devices such as D-VHS 100 and TV 200 are connected to an IEEE1394 bus 300 having plural channels. These devices constitute one system controllable as a unit.

The D-VHS 100 includes a VCR 110. The TV 200 has a monitor 210. The VCR 110 and monitor 210 are controlled as subunits.

In this system, a PC, not shown, is connected to the IEEE 1394 bus 300 for controlling the system as the controller. This PC controls the subunits incorporated in these devices.

In the other embodiments explained below, although not shown, the PC plays the same role.

The operation of the system having such configuration is explained.

Broadcast out Connection is established between the D-VHS 100 and a specified channel of the IEEE1394 bus 300. Herein, the specified channel is channel 0 as shown in FIG. 1. On the other hand, Broadcast in Connection is established between channel 0 of the IEEE1394 bus 300 and TV 200.

In this state, an AV signal sent out from the D-VHS 100 is issued to the TV 200 as isochronous data via a channel 0 of the IEEE1394 bus 300. In the monitor 210, the AV signal recorded in the VCR 110 is displayed and issued as a picture and a sound.

In the state of such isochronous data transfer, the user of this system requests, by using the PC not shown, the D-VHS 100 to acquire the information about the connection state of the devices connected to the IEEE1394 bus 300, the type of devices, or operating state of each device. This request is made specifically by using a keyboard or other input devices.

The manner of requesting by the user is the same in the following embodiments 2 to 6.

Once the request is made, from the PC via the bus 300, a location of the signal input source giving an input to a destination plug 211 of the monitor 210 in the TV 200 is inquired in a path 252 shown in FIG. 1 as follows.

(1) Using the "command for inquiring the signal source of the unit or subunit" in FIG. 7, Destination Plug number of the destination of inquiry is designated.

(2) Responding to this inquiry, the monitor 210 replies "the destination plug 211 is obtaining an input from the digital input plug 201 of the TV 200" by using the "response from a subunit when the signal source is an input plug, to a command for inquiring the signal source of the subunit" in FIG. 8.

This is an essential point for the invention. That is, the signal source is known by one inquiry only.

To investigate the signal source more specifically, the following procedure is executed.

(3) To the TV 200, the input plug number is designated by the "command for inquiring the signal source (output plug of unit) of an input plug of a unit" in FIG. 15, and the location of the signal input source feeding the input to the digital input plug 201 is inquired.

(4) The TV 200 replies "the digital input plug 201 is obtaining an input from channel 0 transferring the isochronous data."

When the information is obtained further, the reply "channel 0 transferring the isochronous data is receiving input from the digital output plug 102 of the D-VHS 100" is obtained by the "response to a command for inquiring the signal source to a digital output plug" in FIG. 16.

If not having the capability of replying to the command, i) The PC investigates into the external input plug of the TV 200, and obtains the channel number of the bus being entered therein.

ii) Next, PLUG INFO command is sent to all devices on the bus.

iii) When the device outputting a signal to the inquired channel receives this command, it replies "the fact that its own outputs the signal and the output plug number" to the PC.

This reply is made through a path 254 in FIG. 1.

When the signal source is not the digital input plug, but is an external output plug (connected to a BS antenna), for example, through the tuner incorporated in the D-VHS 100, the "response when the signal source is an input plug" of the "response from a unit of inquiry about a digital output plug to a command for inquiring the signal source of the unit" in FIG. 10 (a) is returned.

At this time, using the external plug type (external plug input type) shown in FIG. 10 (a), the type of the external input plug can be also informed.

(5) Next, the PC inquires the location of the input signal source giving an input to the digital output plug, to the D-VHS 100 in the bus 300 and path 256 in FIG. 1, by designating the output plug by using the "command for inquiring the signal source of the unit or subunit" in FIG. 7.

(6) The D-VHS 100 replies "the digital output plug 102 is receiving an input from the source plug 112 of the VCR 110" by using the "response when the signal source is a source plug" in FIG. 10 (b).

At this time, suppose the digital output plug 102 is connected to the digital input plug 101 of the D-VHS 100 or external input plug not shown, and is receiving an input of signal. In this case, the inquiry is continued until a source plug of other unit or sub-unit, digital input plug, or external input plug is specified as the final input signal source.

By this series of operation, the origin of the video signal issued to the monitor 210 of the TV 200 at the present is confirmed to be the VCR 110 in the D-VHS 100.

(7) The D-VHS 100 transmits its device information to the PC as a response to the command.

The information of connection state obtained by each response transferred to the PC can be indicated to the user. Not limited to the PC, other devices than the PC connected to the IEEE1394 bus 300 may be also an origin of inquiry. In this case, in the device making an inquiry, the inquiry to itself is omitted. For example, when the TV 200 inquires, it is not necessary to inquire a signal source to the monitor 210.

The roles of the PC about indication of the information of the connection state, and the operation of the device at the origin of inquiry are the same as in the following embodiments.

(8) When the device information is acquired, the TV 200 superposes on the AV signal which is isochronous data, and displays the information in the monitor 210.

In this operation, the TV 200 and D-VHS 100 have one subunit each.

If possessing plural subunits, as far as disposed in the path 252 or 254 in FIG. 1, each subunit is regarded as a mere signal path.

Figure 22A:
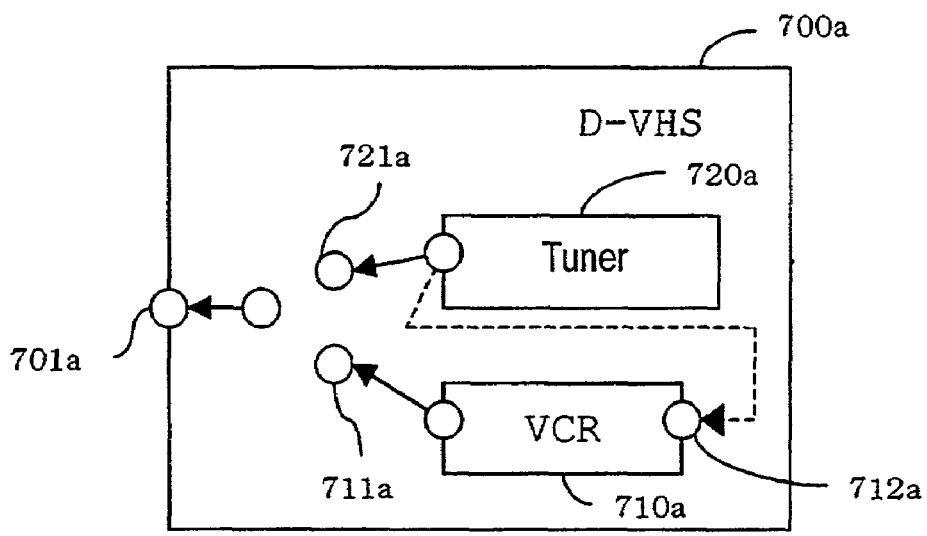
FIG. 22 (a), (b) show examples of connection state of subunit inside of STB.
Figure 22B:
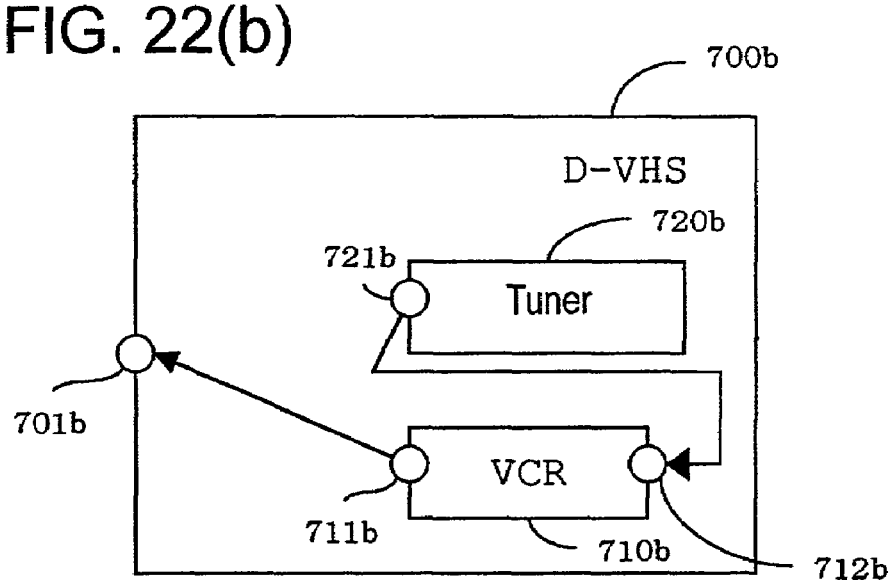

In the TV 200, up to the digital input plug 201, or in the D-VHS 100, up to the VCR 110, the output location of the signal is confirmed by one command and one response. Therefore, as in the D-VHS 700a, 700b shown in FIG. 22, for example, in the case of the unit having plural subunits differing in the manner of connection, the signal source can be known immediately.

In the embodiment, it is explained on the assumption that a broadcast connection is established between the TV 200 and D-VHS 100. In the established state of point-to-point connection, too, the device control method of the embodiment can be executed.

In the embodiment, the operation of the information acquisition request is supposed to be executed by the user's voluntary operation. Instead, this operation may be done automatically when the broadcast connection or point-to-point connection is established between the units.

Figure 2:
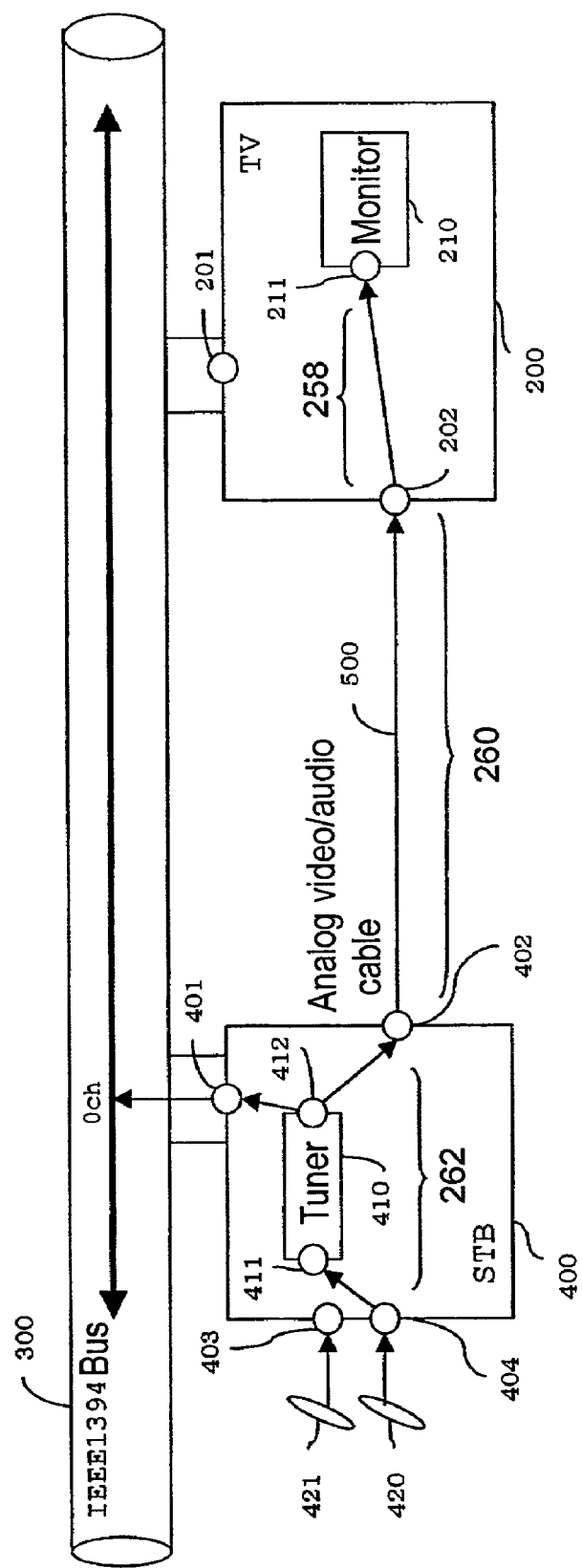
FIG. 2 shows a configuration of a second example of the system operating by using the device control method in embodiment 1 of the invention.

FIG. 2 shows a configuration diagram of a second example of the system operating by using the signal source detection method according to the embodiment. In FIG. 2, elements shown with the same reference numerals as in FIG. 1 operate in the same as or similar manner to the elements in FIG. 1.

A set top box (STB) 400 is, like the TV 200, a device controllable as a unit, being connected to the IEEE1394 bus 300. The STB 400 has a digital output plug 401 and an external output plug 402, and also includes a tuner 411 controllable as a subunit. The TV 200 includes a digital input plug 201 and an external input plug 202. The TV 200 and STB 400 are connected with each other by way of the IEEE1394 bus 300. The external input plug 202 and external output plug 402 are connected through an analog video-audio cable 500.

First, an AV signal issued from the STB 400 is transmitted between the external input plug 202 and external output plug 402 as an analog signal, and is issued to the TV 200. In the monitor 210, the AV signal received in the STB 400 through an antenna 420 is displayed and issued. On the other hand, the STB 400 and the TV 200 are mutually exchanging signals for controlling the unit or subunit as asynchronous data on the IEEE1394 bus 300.

During transfer of AV signal by the analog signal, the user requests the PC, which is the controller not shown, to acquire information about the type of device or operating state.

According to this request, the following inquiries are made to the monitor 210 of the TV 200.

(1) The destination plug is designated by the command in FIG. 7, and the location of the signal input source giving input to the destination plug 211 is inquired.

(2) Responding to this inquiry, the monitor 210 replies "the destination plug 211 is obtaining input from the external input plug 202 of the TV 200." Herein, in the "response from a subunit when the signal source is an input plug, to a command for inquiring the signal source to the subunit" in FIG. 8, Signal Source Plug is shown to be "external".

In the same manner as in the first example, in the TV 200, the output location of the signal can be known by one command and one response, which is an essential point for the invention.

To investigate the signal source more specifically, the following procedure is executed.

(3) In succession, the PC inquires the TV 200 "from which the external input plug 202 of the TV 200 is receiving input," by designating the plug to be "external" in the command in FIG. 15. At this time, if the connection correspondence of the external input plug 202 has been already recorded in the TV 200, the STB 400 obtains the reply "the external input plug 202 of the TV 200 is receiving input from the external output plug 402 of the STB 400" according to this record. This response is made in the path 260 in FIG. 2 by the "response to a command for inquiring the signal source to an external input plug" in FIG. 17.

(4) In the path 262 in FIG. 2, consequently, the location of the input signal source giving input to the external output plug 402 of the STB 400 is inquired to the STB 400 by designating the "plug" to be "external" in the command in FIG. 7.

(5) As a result, the STB 400 replies "the external output plug 402 is receiving input from the external input plug 404 of the STB 400 via the source plug 412 and the destination plug 410 of the tuner 411, by the "response when the signal source is a source plug" in the "response from a unit to a command for inquiring the signal source of an external output plug of the unit" in FIG. 11 (*b*).

Figure 3A:
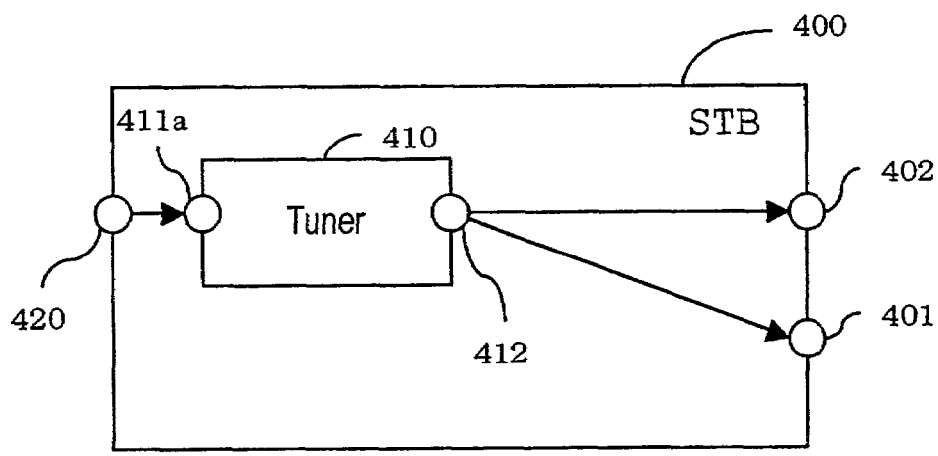
FIG. 3 (a), (b) show a configuration of STB in the system in embodiment 1 of the invention.
Figure 3B:
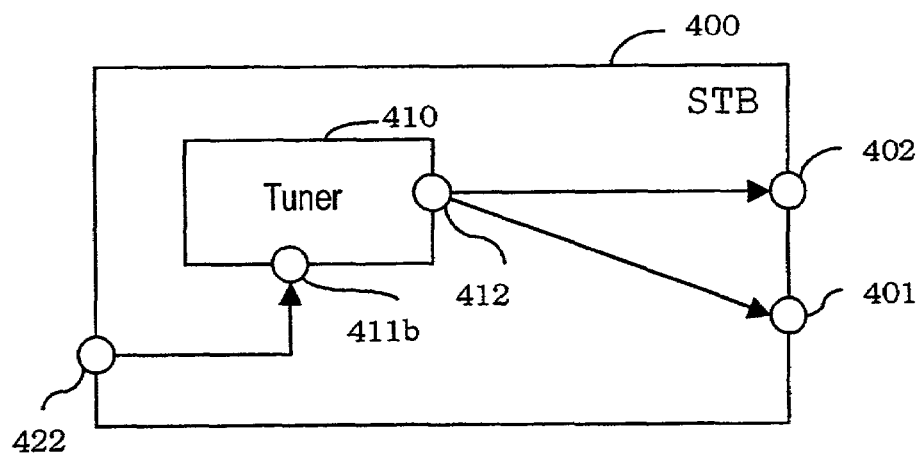

A further example of configuration of the STB 400 is shown in FIG. 3 (*a*), (*b*). In the STB 400, the tuner 410 only selects the station of the signal or passes through an external input. Therefore, as shown in FIG. 3 (*a*), when the external input plug connected to the digital BS antenna is connected to the destination plug 411*a* of the tuner 410, as explained above, the final input signal source is the external input plug 420 of the STB 400. At this time, when the connection correspondence of the external input plug 420 and digital BS antenna has been already given as information, the reply of "digital BS antenna" can be obtained as the final input signal source.

Or, as shown in FIG. 3 (*b*), when the destination plug 411*b* of the tuner 410*b* is connected to the digital input plug 422 of the STB 400, the final input signal source is the digital input plug 422 of the STB 400.

By this series of operation, the origin of the video signal issued to the monitor 210 of the TV 200 at the present is confirmed to be the external input plug 404 (BS antenna 420) in the STB 400. The STB 400 transfers the device information to the PC on the IEEE1394 bus 300 as the response (asynchronous data) to the command.

When the TV 200 acquires the device information, it is processed, and superposed on the AV signal obtained from the external output plug, and displayed in the monitor 210.

Thus, according to the second example of the embodiment, if an analog cable is used in signal transmission, the device can be controlled in the same way as in the first example by using the IEEE 1394 bus 300.

In the embodiment, it is supposed that the commands in FIG. 7, FIG. 8, FIG. 10, FIG. 11, FIG. 15, and FIG. 16 are exchanged between the unit and subunit, but the invention is not limited to these commands. Depending on the connection between the subunits in the system or unit, the type of input plug and output plug of the unit, or the type of signal handled by the plug, commands as shown in FIG. 9, FIG. 12, FIG. 17, and FIG. 18 may be also used.

In FIG. 7 (*a*), "signal_source_number" designates the specific number of the signal source. If there are plural signal sources, a specific signal source is designated. At this time, if not necessary to designate the signal source, only FF16 is entered. In FIG. 8 (*a*), "total_signal_source" shows the number of signal sources.

Figure 17:
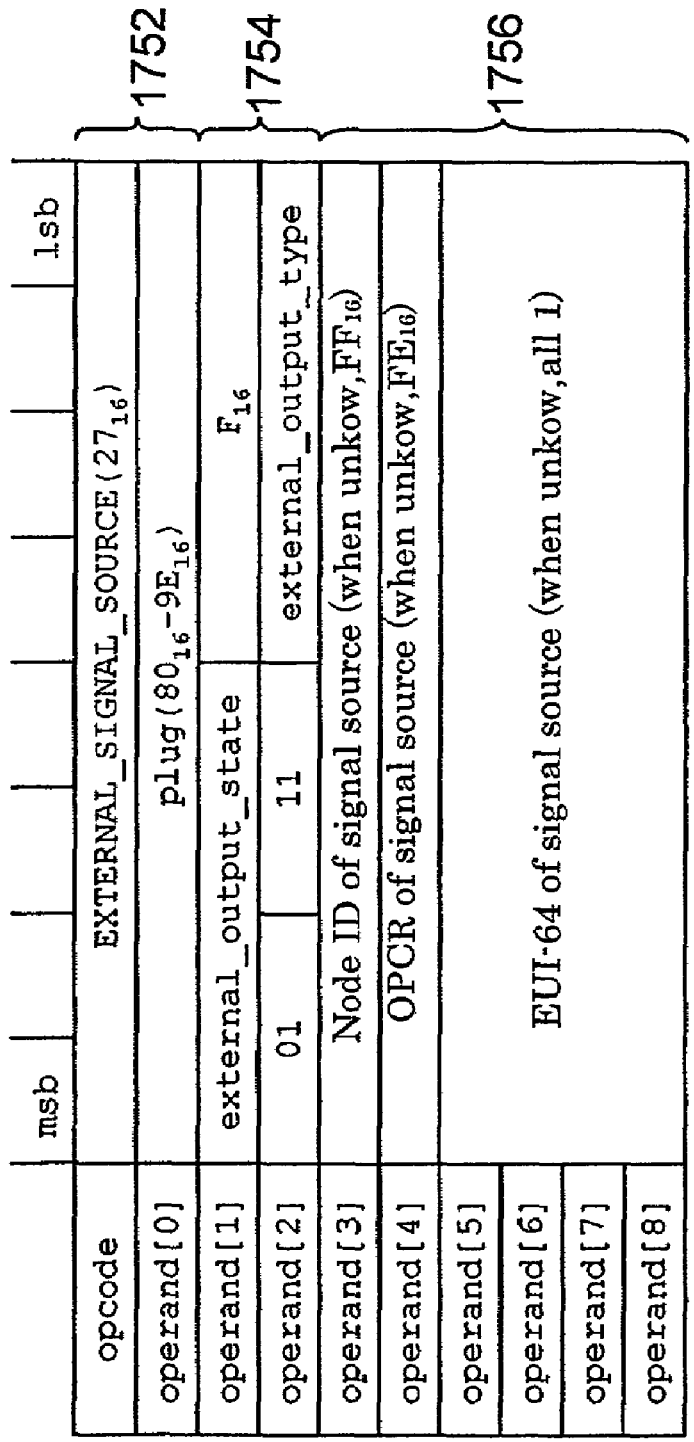
FIG. 17 shows a composition of a "response to a command for inquiring the signal source to an external input plug" used in the invention.
Figure 18:
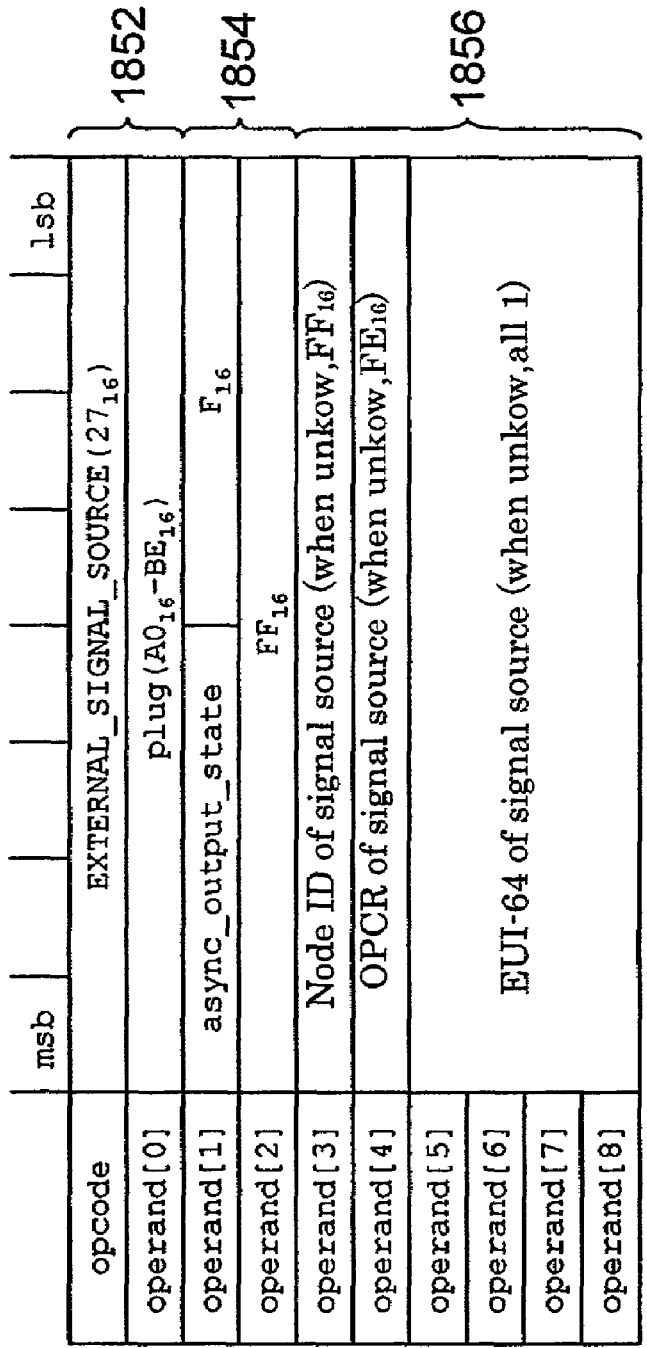
FIG. 18 shows a composition of a "response command to a command for inquiring the signal source to an asynchronous input plug" used in the invention.

In FIG. 9 (*a*), "subunit_type" and "subunit_ID" identify the subunits of signal source. In FIG. 17, "external_output_state" shows the output state of the external plug, and "external_plug_type" shows the type of external plug. In FIG. 18, "async_output_state" shows the output state of the asynchronous plug.

In the responses in FIG. 8 (*a*), FIG. 9 (*a*), FIG. 10 (*a*), (*b*), FIG. 11 (*a*), (*b*), and FIG. 12 (*a*), (*b*), respectively, the upper three lines, depicted by reference numerals 852, 952, 1052, 1058, 1152, 1158, 1252, and 1258 show the same contents as the received commands, the next four lines, depicted by reference numerals 854, 954, 1054, 1060, 1154, 1160, 1254, and 1260 show the replies relating to the signal sources, and the further three lines, depicted by reference numerals 856, 956, 1056, 1062, 1156, 1162, 1256, and 1262 show the replies relating to the outputs. In the responses in FIG. 16 (*a*), FIG. 17, and FIG. 18, the upper two lines, depicted by reference numerals 1652, 1752, and 1852 show the same contents as the received commands, the next two lines, 1654, 1754, and 1854 show the replies relating to the signal sources, and the further six lines depicted by reference numerals 1656, 1756, and 1856 show the replies relating to the signal sources.

Embodiment 2

This embodiment is explained by referring to FIG. 4, FIG. 7, FIG. 8, FIG. 10, FIG. 15, and FIG. 16.

Figure 4:
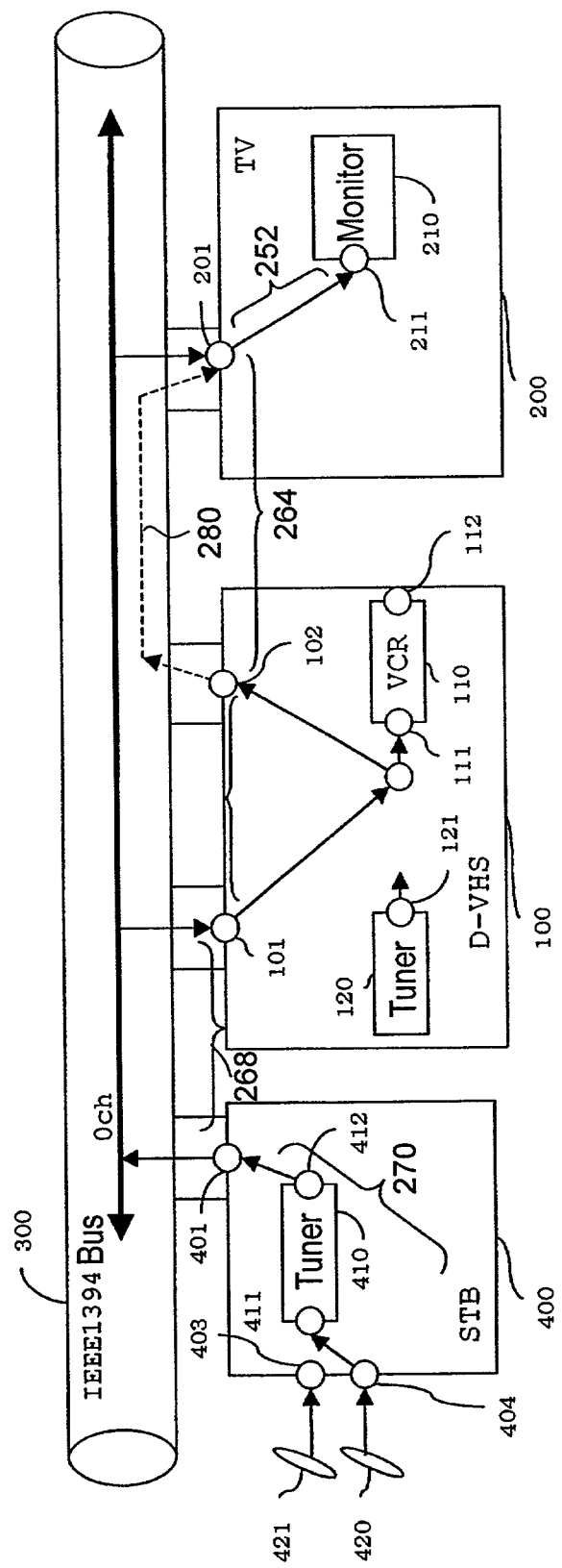
FIG. 4 shows a configuration of a system operating by using a device control method in embodiment 2 of the invention.

As shown in FIG. 4, the STB 400, D-VHS 100, and TV 200 are connected to the IEEE1394 bus 300 having plural channels, and they constitute one system controllable as a unit.

The STB 400 includes a tuner 410. The D-VHS 100 includes a VCR 100 and a tuner 120. The TV 200 has a monitor 210. The tuner 410, VCR 110, tuner 120, and monitor 210 are controlled as subunits.

In this system having such a configuration, the operation is described below.

"Broadcast out Connection" is established between the STB 400 and a specified channel (herein assumed channel 0 as shown in the diagram) of the IEEE1394 bus 300. On the other hand, "Broadcast in Connection" is established between channel 0 of the IEEE1394 bus 300 and the D-VHS 100 and TV 200.

In this state, an AV signal sent out from the STB 400 is issued to the D-VHS 100 and TV 200 as isochronous data via a channel of the IEEE1394 bus 300. In the monitor 210 of the TV 200, the AV signal received in the tuner 410 of the STB 400 through a satellite broadcast reception antenna 420 is displayed and issued as a picture and a sound. The D-VHS 100 records the signal issued from the STB 400 in its internal VCR 10.

In the state of such isochronous data transfer, the user requests, for example, the PC to monitor the signal state between the TV 200 and STB 400, and the D-VHS 100.

Once the request is made, in the bus 300 and path 252 in FIG. 4, the PC inquires the monitor 210 about the state of the destination plug by designating the destination plug number by the command in FIG. 7.

Responding to this inquiry, the monitor 210 replies "the destination plug 211 is obtaining input from the digital input plug 201 of the TV 200" by using the "response from a subunit when the signal source is an input plug, to a command for inquiring the signal source of the subunit" in FIG. 8.

Next, to the TV 200, the state of the digital input plug is inquired by designating the Serial Bus iPCR (digital isochronous input plug) in the "command for inquiring the signal source (output plug of unit) of an input plug of a unit" in FIG. 15. By the "response to a command for inquiring the signal source to a digital output plug" in FIG. 16, the TV 200 replies "the digital input plug 201 is receiving input of isochronous data in channel 0 in the IEEE1394 bus 300 from the digital output plug 102 of the D-VHS 100."

Actually, however, the digital input plug 201 of the TV 200 is obtaining isochronous data output through channel 0 in the IEEE1394 bus 300 from the digital output plug 401 of the STB 400. That is, the TV 200 detects "virtual output" and recognizes that the signal is issued from the digital output plug 102 of the D-VHS 100 in channel 0. Accordingly, in the response in FIG. 16 (*a*), "Output State" shows "virtual output" in the contents of "Output State" in FIG. 16 (*b*).

According to detection of this "virtual output" further, the following response process is carried out.

By designating the digital output plug number by the command in FIG. 7, the state of digital output plug is inquired to the D-VHS 100.

To this inquiry, the D-VHS 100 replies "the digital output plug 102 is obtaining isochronous data input from the digital input plug 101 of the D-VHS 100." The response in FIG. 10 (*a*) shows that the output from the digital output plug is a "virtual output" of "output state" in channel 0 of "1394 isochronous channe" 1. These replies are made through the path 266 in FIG. 4.

In the path 268 in FIG. 4, by designating the digital input plug number by the command in FIG. 7, the state of the digital input plug 101 is inquired to the D-VHS 100.

At this time, the D-VHS 100 replies, by the response in FIG. 8, "the digital input plug 101 is receiving input of isochronous data through channel 0 in the IEEE1394 bus 300 from the digital output plug 401 of the STB 400."

Further, in the path 270 in FIG. 4, the state of the digital output plug 401 is inquired to the STB 400 by designating the digital output plug (oPCR) by the command of "response from the subunit when the signal source corresponding to the command for inquiring the signal source of the subunit is an input plug" in FIG. 7.

The STB 400, by the "response from a unit when the signal source is an input plug, to a command for inquiring the signal source of the unit by designating a digital output plug" in FIG. 10 (*a*), sets the "signal source plug" to be "external", and replies "the digital output plug 401 is receiving input from the external input plug 404 of the STB 400 via the source plug 412 and destination plug 411 of the tuner 410."

As a result of this series of replies explained above, the TV 200 recognizes "virtual output" 280, and knows that the input is obtained from the STB 400 via the D-VHS 100.

On the other hand, in the D-VHS 100, by designating the destination plug by the command in FIG. 7, the state of the destination plug is inquired to the VCR 110.

In return, the VCR 110 sets iPCR by the response in FIG. 8, and replies "the destination plug 111 is receiving isochronous data input from the digital input plug 101 of the D-VHS 100."

By this reply, it is recognized that the D-VHS 100 is recording the input from the STB 400.

Summing up the operation, the TV 200 recognizes that the input is obtained from the STB 400 via the D-VHS 100. The D-VHS 100 recognizes that the input from the STB 400 is recorded. Therefore, when the series of replies is completed, the PC assumes "the TV 200 is monitoring the signal of the STB recorded in the D-VHS 100."

As a result, the TV 200 recognizes that the origin of the video signal issued in the monitor 210 is the STB 400, and it is regarded as the monitor signal from the D-VHS 100. The TV 200 can superpose this information on the AV signal, that is, isochronous data, and display in the monitor 210.

In the embodiment, the operation of the input changeover request is supposed to be executed by the user's voluntary operation, but this operation may be done automatically when the "broadcast connection" or "point-to-point connection" is established between the units.

In the embodiment, it is supposed that the commands in FIG. 7, FIG. 8, FIG. 10, FIG. 15, and FIG. 16 are exchanged. However, the invention is not limited to these commands, and depending on the connection between the subunits in the system or unit, the type of input plug and output plug of the unit, or the type of signal handled by the plug, commands as shown in FIG. 9, FIG. 11, FIG. 12, FIG. 17, and FIG. 18 may be also used.

Embodiment 3

The device control method according to this embodiment is to connect the units mutually after connecting the subunits in each unit.

Figure 5:
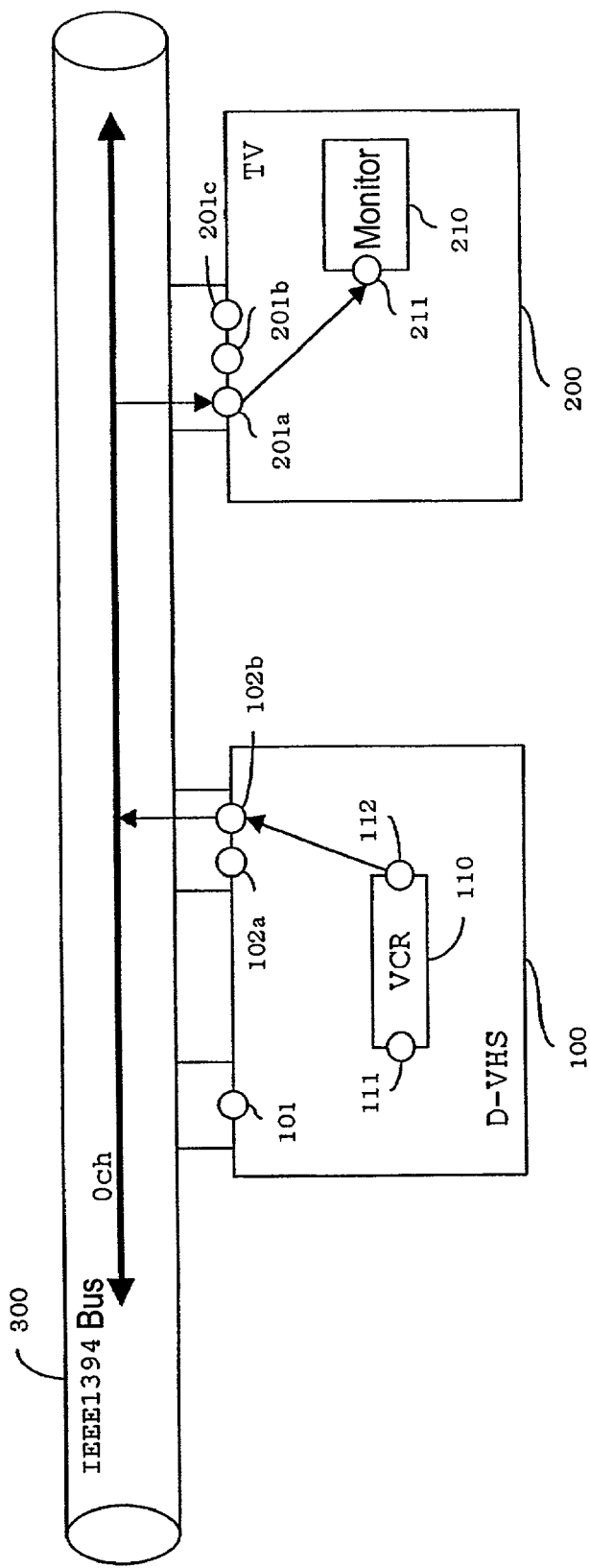
FIG. 5 shows a configuration of a system operating by using a device control method in embodiment 3 of the invention.

FIG. 5 shows a configuration of a system operating according to embodiment 3 of the invention.

As shown in FIG. 5, the D-VHS 100 and TV 200 are connected to the IEEE1394 bus 300 having plural channels, and constitute one system controllable as a unit.

The D-VHS 100 includes a VCR 110. The TV 200 has a monitor 210. The VCR 110 and monitor 210 are controlled as subunits.

The D-VHS 100 has plural digital output plugs 102a and 102b.

The TV 200 has plural digital plugs 201a, 201b, and 201c. These digital input and output plugs are mutually distinguishable in this system.

FIG. 13 shows a composition of a "command for designating the signal source of a subunit" used in the embodiment.

The operation of the system having such a configuration is explained below.

First, the procedure is explained.

The PC, using the "command for designating the signal source of the subunit when designating an input plug as the signal source" in FIG. 13 (a), (1) Requests the monitor 210 of the TV 200 to set the digital input plug of the TV 200 as the signal source, in the destination plug 211. At this time, the digital input plugs prepared in the TV 200 are plug 201a, plug 201b, and plug 201c.

It is also possible not to make a request for setting to any plugs. For example, when a specific digital input plug and the destination plug are permanently connected, setting may not be established if other plugs are set. Accordingly, the command in this embodiment does not designate the plug, whereas the command reception side selects the input plug. Herein, it is supposed that setting is made on the digital input plug 201a.

(2) Requests consequently to the D-VHS 100 to set the source plug 112 of the VCR 110 of the D-VHS 100 as the signal source, in the digital output plug.

In this case, too, in the same way as in the case of digital input plug of the TV 200, it is not specified to set in which one of the plural digital output plugs 102a, 102b. Herein, it is supposed that setting is made on the digital output plug 102b. At this time, in the above operations, the sequence of operations (1) and (2) may be exchanged.

(3) Requests finally to the digital input plug 201a of the TV 200 to connect to the digital output plug 102b of the D-VHS 100, so that the two are connected.

In operation (1), it may be requested to the output plug of the TV 200 to set the input plug of the TV 200 as the signal source. Or, to the monitor 210, it may be requested to set the source plug as the signal source in the destination plug 211.

In operation (2), it may be requested to the output plug of the D-VHS 100 to set the input plug of the D-VHS 100 as the signal source. Or, it may be requested to set the source plug as the signal source in the destination plug of the VCR 110.

Thus, according to the device control method of the embodiment, since units are connected after connecting subunits in each unit, setting of a unit having plural input and output plugs can be done efficiently.

Incidentally, in the VCR 110 which is a subunit of the D-VHS 100, if other active subunits are present (such as VCR or hard disk drive (HDD)), and when setting them as the signal source, the subunits and the corresponding source plug numbers can be designated by the "command of designating the source plug as the signal source" shown in FIG. 13 (b).

In the embodiment, the commands in FIG. 13 are exchanged, but the invention is not limited to these examples alone.

Figure 19:
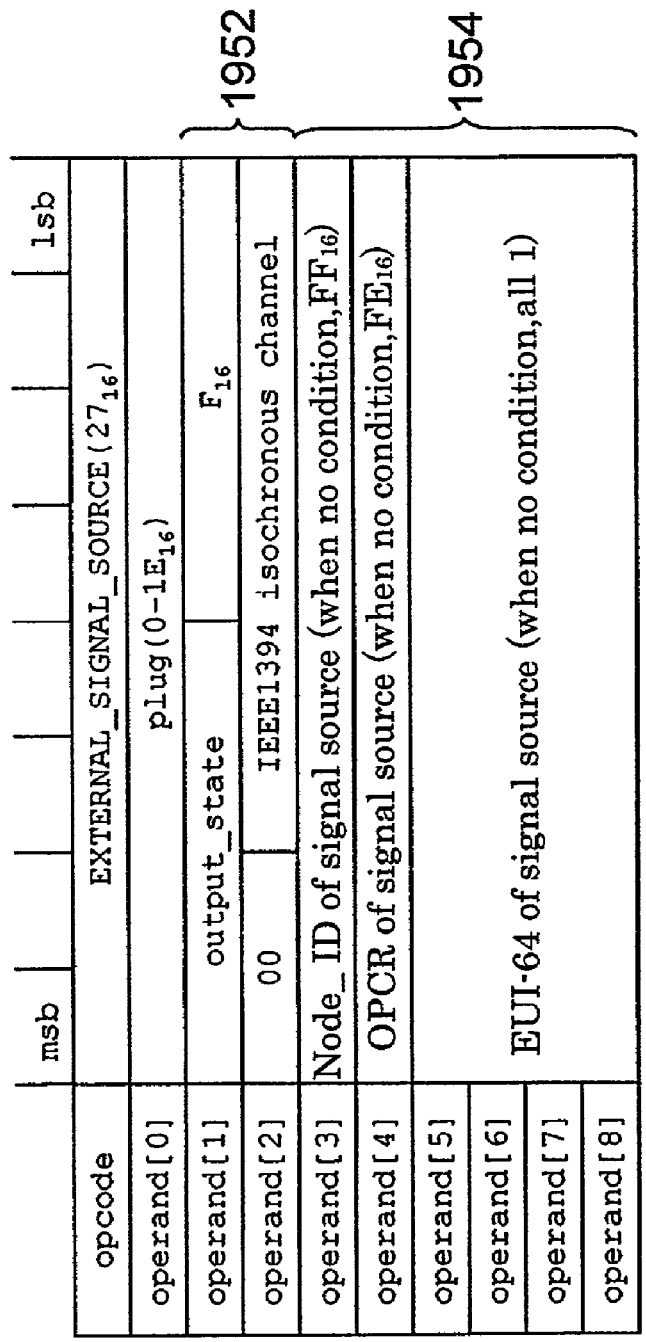
FIG. 19 shows a composition of a "command for setting the designated digital output plug in the digital input plug of the target unit of the command as the signal source" used in the invention.
Figure 21:
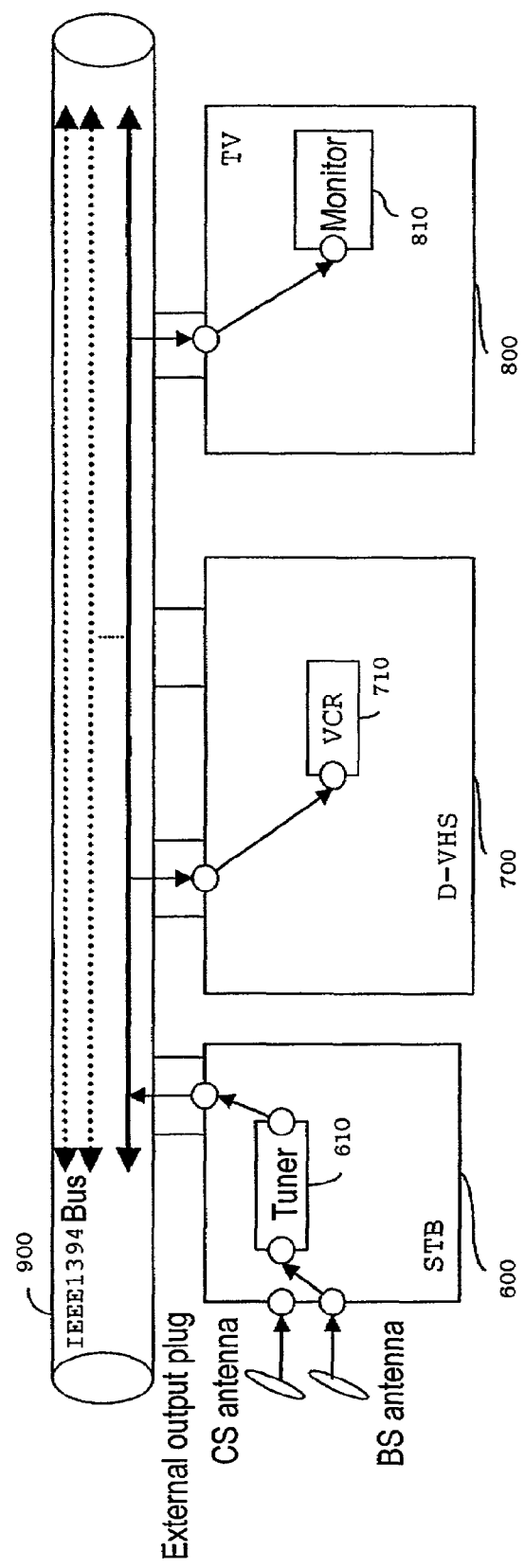
FIG. 21 shows a configuration of a system having plural devices connected by IEEE1394 interface in a prior art.

Depending on the connection between the subunits in the system or unit, the type of input plug and output plug prepared in the unit, or the type of signal handled by the plug, various commands may be used, such as "command for designating the signal source of a unit" in FIG. 14, "command for making the digital input plug of the target unit of the command to set the designated digital output plug as the signal source" in FIG. 19, and "command for making the designated external output plug in the external input plug of the target unit of the command to setas the signal source" in FIG. 20.

In the commands in FIG. 19 and FIG. 20, the plug field designates a plug. In FIG. 19, output_state shows the output state, and IEEE1394 isochronous channel shows the input channel. In FIG. 20, external_output_state shows the output state of the external plug, and external_output_type shows the type of external plug. In FIG. 19 and FIG. 20, either node_ID or EUI-64 needs to be set.

In FIG. 13 (a) and FIG. 14 (a), four lines from the fourth line from the top, depicted by reference numerals 1352 and 1452 inquire about the signal source, and the next three lines, depicted by reference numerals 1354 and 1454 inquire about the output. In FIG. 13 (b) and FIG. 14 (b), four lines from the fourth line from the top, depicted by reference numerals 1356 and 1456 reply about the signal source, and the next three lines, depicted by reference numerals 1358 and 1458 reply about the output.

In FIG. 19 and FIG. 20, two lines from the third line from the top, depicted by reference numerals 1952 and 2052 reply about the output, and the next five lines, depicted by reference numerals 1954 and 2054 reply about the signal source.

Embodiment 4

Figure 6:
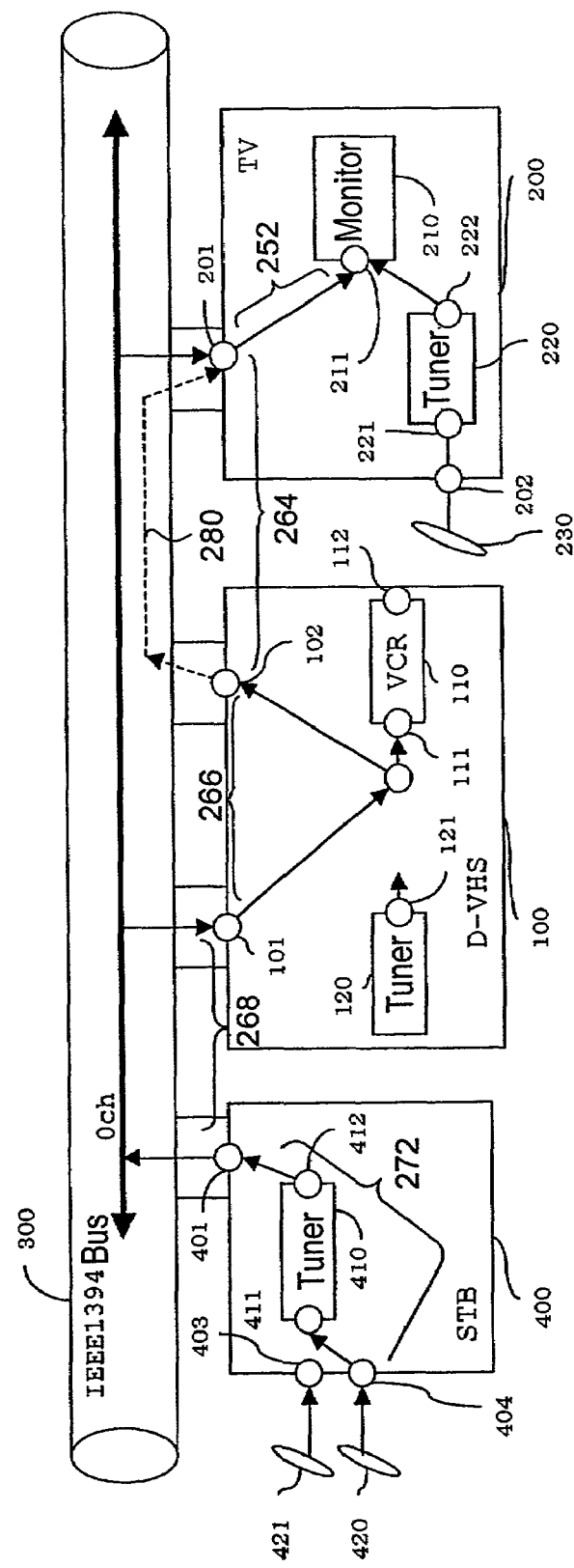
FIG. 6 shows a configuration of a system operating by using a device control method in embodiment 4 of the invention.

In FIG. 6, elements depicted by the same reference numerals as in FIG. 4 work in the same way as or similar way to those in FIG. 4, and hence their explanation is omitted. In the TV 200, a tuner 220 receives a signal input from a satellite broadcast reception antenna 230 by way of an external input plug 202.

FIG. 13 and FIG. 19 are diagrams showing a composition of commands used in the virtual output setting method in the embodiment.

First, an AV signal issued from the STB 400 is issued to the D-VHS 100 and TV 200 as isochronous data by way of channel 0 of the IEEE1394 bus 300.

In the TV 200, the following operation is carried out.

The tuner 220 is receiving a signal from the satellite broadcast reception antenna 230. The tuner 220 issues an AV signal from the source plug 222. The monitor 210 displays and issues the AV signal entered in the destination plug 211 as a picture and a sound.

On the other hand, in the D-VHS 100, the VCR 110 is recording the signal issued from the STB 400.

In such state of isochronous data transfer, the user is viewing and hearing the signal received in the tuner 220 of the TV 200. Herein, the user requests the PC to monitor the signal recorded in the D-VHS 100.

When this request is issued, the PC instructs the monitor 210 to change over to obtain input from the digital input plug 201 of the TV 200 by using the "command for designating the input plug as signal source" in FIG. 13 (a), by way of the bus 300 and path 252 in FIG. 6.

Consequently, the PC sends a request to the TV 200 to receive the input of isochronous data issued in channel 0 in the IEEE1394 bus 300 from the digital output plug 102 of the D-VHS 100, by using the "command for making the digital input plug of the target unit of the command to set the designated digital output plug as the signal source" in FIG. 19.

Actually, however, no output is sent from the digital output plug of the D-VHS 100. The digital input plug 102 of the TV 200 receives the same signal as recorded in the D-VHS 100, that is, the isochronous data output signal through channel 0 in the IEEE1394 bus 300 from the digital output plug 401 of the STB 400. In other words, the TV 200 detects a virtual output 280, and recognizes it is issued in channel 0 from digital output plug 102 of the D-VHS 100.

By replying such a command, the TV 200 can obtain input from the STB 400 by recognizing as if obtaining through the D-VHS 100 by using the "virtual output".

In the embodiment, the commands in FIG. 13 and FIG. 19 are explained to be exchanged, but the invention is not limited to them. Depending on the connection between the subunits in the system or unit, the type of input plug and output plug prepared in the unit, or the type of signal handled by the plug, commands as shown in FIG. 14 and FIG. 20 may be also used. Further, depending on the configuration, the commands used in other embodiments may be also used.

Embodiment 5

Figure 23A:
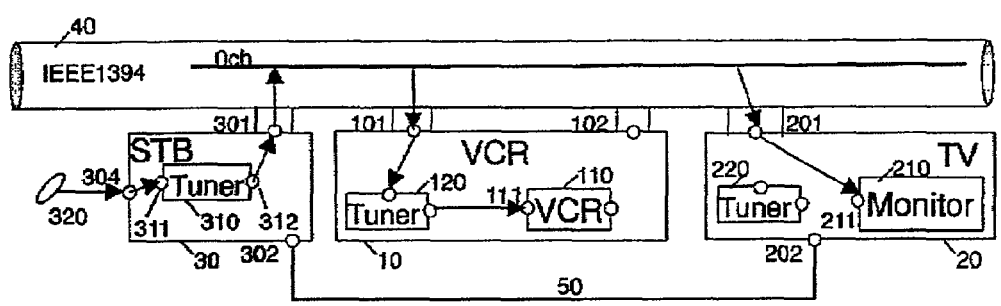
FIG. 23 shows a configuration of a system operating by using a device control method in embodiment 5 of the invention.
Figure 23B:
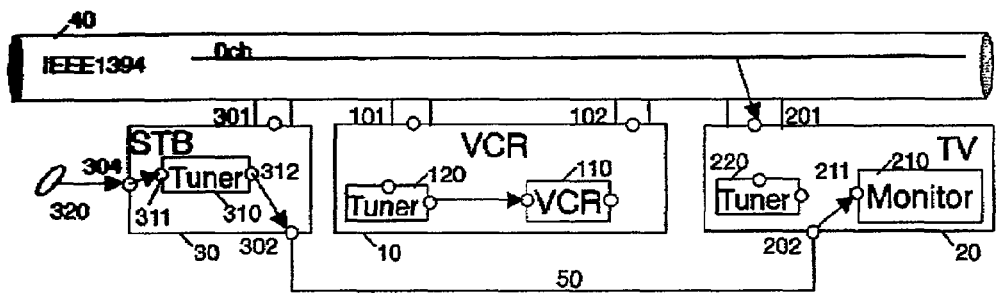

FIG. 23 is a configuration diagram of a system operating by using a signal source detection method in embodiment 5 of the invention. As shown in FIG. 23, D-VHS 10, TV 20, and STB 30 are connected to IEEE1394 bus 40 having plural channels, and constitute a system controllable as a unit.

The D-VHS 10 includes a VCR 110 and a tuner 120. The TV 20 includes a monitor 210 and a tuner 220. The STB 30 includes a digital output plug 301, an external output plug 302, and a tuner 310 controllable as a subunit. The TV 20 also has a digital input plug 201 and an external input plug 202. The TV 20 and STB 30 are mutually connected through the IEEE1394 bus 40. The external input plug 202 of the TV 20 and the external output plug 302 of the STB 30 are connected through an analog video-audio cable 50.

The operation of this system is explained.

According to the request from the user, the PC inquires the location of the signal source giving input to the destination plug of the monitor 210 in the TV 20 in the following procedure.

1) The PC, in a newly defined SIGNAL SOURCE status shown in FIG. 24, designates the type and number of the monitor 210 and the destination plug number, and transmits them to the TV 20.

2) As shown in FIG. 23 (a), while the TV 20 is receiving the digital signal through the digital input plug, when this inquiry is made, the monitor 210 replies "the destination plug 211 is obtaining an input from the digital input plug 201 of the TV 20" by "SIGNAL SOURCE status response" shown in FIG. 25.

3) In the following case:

As shown in FIG. 23 (b), an AV signal issued from the STB 30 is transmitted from the external output plug 302 to the external input plug 202 as analog signal, and issued to the TV 20. The monitor 210 is displaying and issuing the AV signal received in the STB 30 through the BS antenna 320.

When inquired in this state, the monitor 210 replies "the destination plug 211 is obtaining input from the external input plug 202 of the TV 20." In the response in FIG. 37 (a) (response to CONNECT control command), Signal Source Plug is shown to be "external".

4) Herein, in the external input plug 202 or destination plug 211, when on-screen display (OSD) data is superposed on the signal, the connect_status field shown in FIG. 4 is indicated to be OSD. The OSD data is channel number superposed and displayed on the image data, data about broadcast contents, or closed caption data. It is therefore known that OSD data is added in the midst of signal.

FIG. 26 (b) shows the contents of "connected_status field" of the "response to the SIGNAL SOURCE control command" in FIG. 29.

5) Aside from OSD or "DeMUX" mentioned below, if any change is added on the signal, the "modified" value is returned. To know the detail of change, the internal state of the subunit is closely investigated.

6) When, from the PC to the D-VHS 10, an inquiry about the location of the input signal source giving input to the destination plug 111 of the VCR 110 is made by designating the output plug by using the command in FIG. 24, the D-VHS 10 replies "the destination plug 111 is receiving input from the digital input plug 101 regardless of the intervening tuner 120" in the SIGNAL SOURCE status response in FIG. 25.

7) Suppose a case that inquiry about a location of input signal source giving input to the external output plug 302 of the STB 30 is made to the STB 30. In the SIGNAL SOURCE status command in FIG. 24, by specifying the plug to be "external", the signal source to the external output plug 302 can be inquired.

8) The STB 30 replies, by the SIGNAL SOURCE status response in FIG. 3, "the external output plug 302 is receiving input from the external input plug 304 of the STB 30 through the source plug 312 and destination plug 311 of the tuner 310."

9) On the other hand, suppose a case that inquiry about a location of the input signal source giving input to the digital output plug 301 of the STB 30 is made.

In the command in FIG. 24, by specifying the plug to be "Digital Serial Bus", the signal source to the digital output plug 301 can be inquired.

The STB 30 replies, by the SIGNAL SOURCE status response in FIG. 25, "the digital output plug 301 is receiving input from the external input plug 304 of the STB 30 through the source plug 312 and destination plug 311 of the tuner 310."

Herein, in the STB 30, suppose the tuner 310 operates only to select the signal station or issue an external input directly. When an external input plug connected to the digital satellite broadcast reception antenna is further connected to the destination plug 311 of the tuner 310, as explained above, the final input signal source may be requested as the external input plug 304 of the STB 30.

At this time, if the correspondence of the external input plug 304 and digital BS antenna 320 is preliminarily given as information, the final input signal source may be replied as digital satellite broadcast antenna. The connect_status field shown in FIG. 26 (b) is indicated to be normal. As a result, it is known that "the demultiplexer of the tuner is present in the midst of the signal path but the signal is issued directly in the state of the input as is".

To the contrary, when the digital broadcast signals multiplexing plural programs are separated by the demultiplexer of the tuner and only part of plural programs is issued, the connect_status field shown in FIG. 26 (b) is shown as DeMUX.

This is in the same as in the case of the VCR 110 in FIG. 23 (a). The input from the digital input plug 101 of the signal source to the destination plug 111 is made by way of the tuner 120, but in the case that direct output of an external input is made, the connect_status field shown in FIG. 14(b) is indicated to be "normal". On the other hand, when the digital broadcast signals multiplexing plural programs are separated by the demultiplexer of the tuner and only part of plural programs is issued, the connect_status field shown in FIG. 26 is shown as DeMUX.

In this operation, if the TV 20 and D-VHS 10 have plural subunits, the intermediate subunits are regarded as mere signal paths. In the TV 20, up to the digital input plug 201, or in the D-VHS 10, up to the VCR 110, the output location of the signal can be confirmed by one command and one response. Therefore, even in the unit having plural subunits differing in the manner of connection, the signal source can be known immediately.

In the embodiment, between the unit and subunit, the command in FIG. 24 and response in FIG. 25 are exchanged, but the invention is not limited to them, and as far as having the same functions, commands and responses of other formats may be also used.

In the embodiment, the operation of the information acquisition request is supposed to be executed by the user's voluntary operation, but this operation may be done automatically when the connection is established between the units.

Embodiment 6

Figure 27:
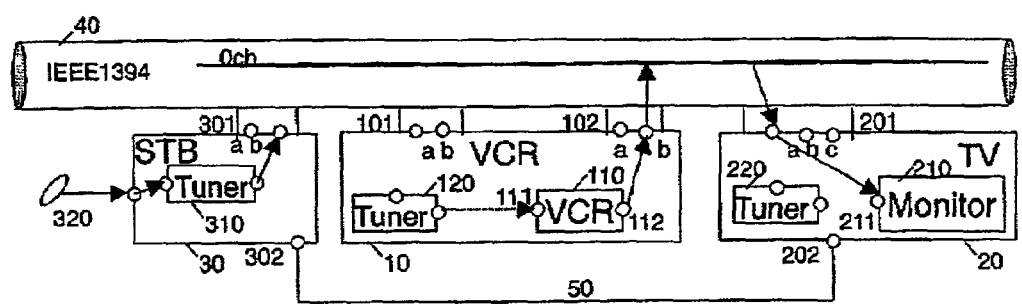
FIG. 27 shows a configuration of the system operating by using the device control method of embodiment 2 of the invention.

FIG. 27 is a configuration diagram of a system according to embodiment 6 of the invention. As shown in FIG. 27, D-VHS 10 and TV 20 are connected to IEEE1394 bus 40 having plural channels same as in FIG. 1 showing embodiment 5, and constitute a system controllable as a unit.

The following points differ from FIG. 23.

The D-VHS 10 has plural digital output plugs 102a and 102b. The TV 20 has plural digital input plugs 201a, 201b, and 201c. These digital input and output plugs are mutually distinguishable in this system.

FIG. 28 shows a composition of SIGNAL SOURCE control command used in the embodiment.

The operation of the system having such a configuration is explained below.

In the device control method of the embodiments, after connecting subunits in each unit, the units are connected.

The procedure is explained.

(1) The PC, using the SIGNAL SOURCE control command shown in FIG. 6, requests the digital output plug of the D-VHS 10 to set the source plug 112 of the VCR 110 of the D-VHS 10 as the signal source.

Herein, it is supposed that setting is made on the digital output plug 102b. At this time, two digital output plugs are prepared in the D-VHS 10, that is, plug 101a and plug 101b.

It is also possible to specify so as not to make a request for setting to any plugs. For example, when a specific digital input plug and the destination plug are permanently connected, setting may not be established if other plugs are set. Accordingly, in the embodiment, not specifying the plug, the plug is selected at the command reception side.

Herein, it is supposed that setting is made on the digital input plug 301a.

FIG. 297 shows SIGNAL SOURCE control response to the SIGNAL SOURCE control command at this time.

(2) Consequently, a connection request to the digital output plug 102b of the D-VHS 10 is made to the digital input plug 201a of the TV 20, and the both are connected.

(3) Finally, to the monitor 210 of the TV 20, it is requested to set the digital input plug of the TV 20 as the signal source, to the destination plug 211. In this case, the digital input plug 201a is designated and connected.

In operation (1), it may be requested to the output plug of the TV 200 to set the input plug of the TV 20 as the signal source. Or, to the monitor 210, it may be requested to set the source plug as the signal source in the destination plug 211.

In operation (2), it may be requested to the output plug of the D-VHS 100 to set the input plug of the D-VHS 100 as the signal source. Or, it may be requested to set the source plug as the signal source in the destination plug of the VCR 110.

Thus, according to the device control method of the embodiment, since units are connected after connecting subunits in each unit, setting of a unit having plural input and output plugs can be done efficiently.

FIG. 29 shows SIGNAL SOURCE control response to SIGNAL SOURCE control command. When connected successfully, in the same manner as the connected_status in SIGNAL SOURCE status command, a connected_status field is returned.

For example, when the output from the VCR subunit 110 in the D-VHS 10 is demultiplexed in the built-in tuner 120, DeMUX is returned in connected_status field.

In a special case, in operation (1), when it is requested to the digital output plug of the D-VHS 10 to set the source plug 112 of the VCR 110 of the D-VHS 10 as the signal source, actually, when the VCR 110 is receiving the signal from the tuner 120 and merely sending it out, the signal path of the source plug of the VCR 110 and the digital output plug of the D-VHS 10 is established, but the signal source is the source plug of the tuner 120.

To distinguish such a case, "through" is provided in the connected_status field. As a result, when the source plug of the sub unit is designated as the signal source, it can be distinguished whether it is an actual signal source or a repeater point of the path to the signal source.

In the embodiment, the command in FIG. 28 is exchanged, but the invention is not limited to this, and depending on the connection between the subunits in the system or unit, the type of input plug and output plug prepared in the unit, or the type of signal handled by the plug, other commands having similar function may be also used.

Embodiment 7

Figure 30A:
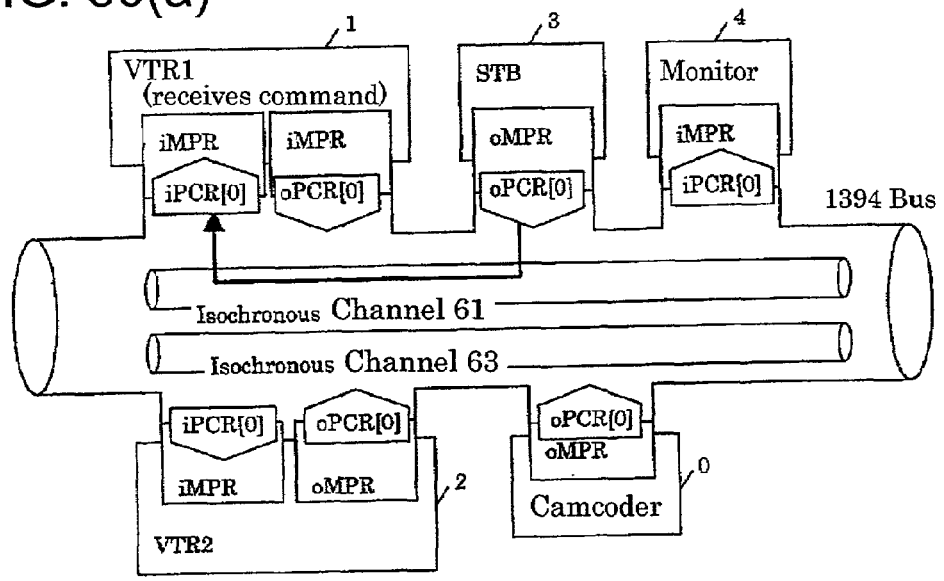
FIG. 30 (a), (b) are diagrams for explaining a device connection method according to an embodiment of the invention.
Figure 30B:
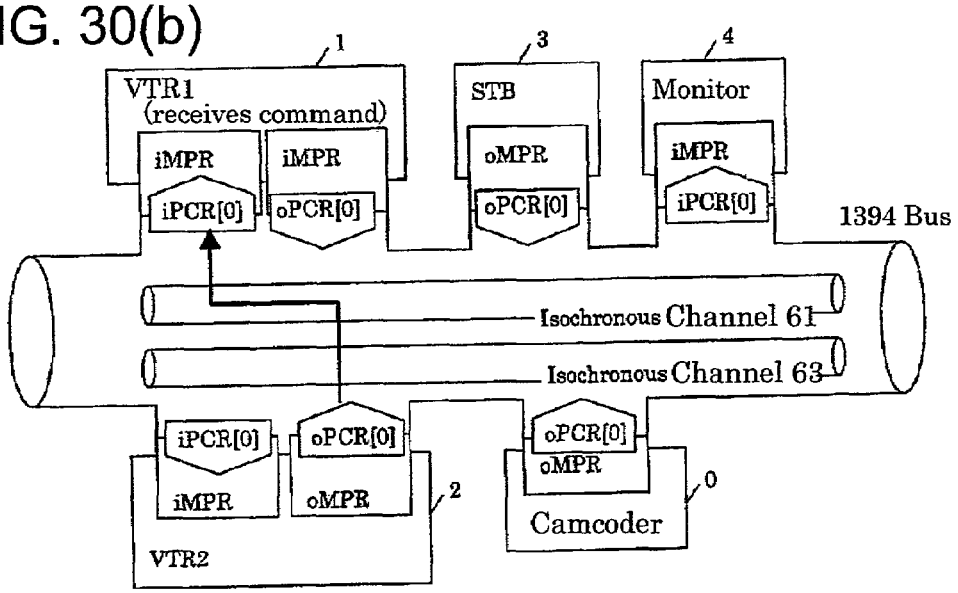
Figure 35:
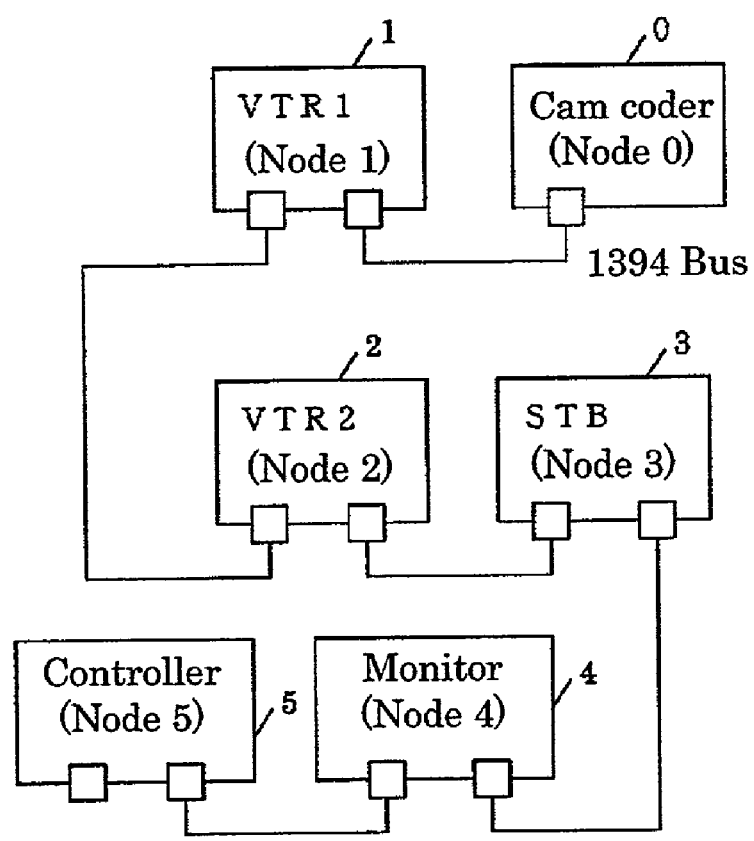
FIG. 35 shows a physical connection of units for explaining the invention.
Figure 36:
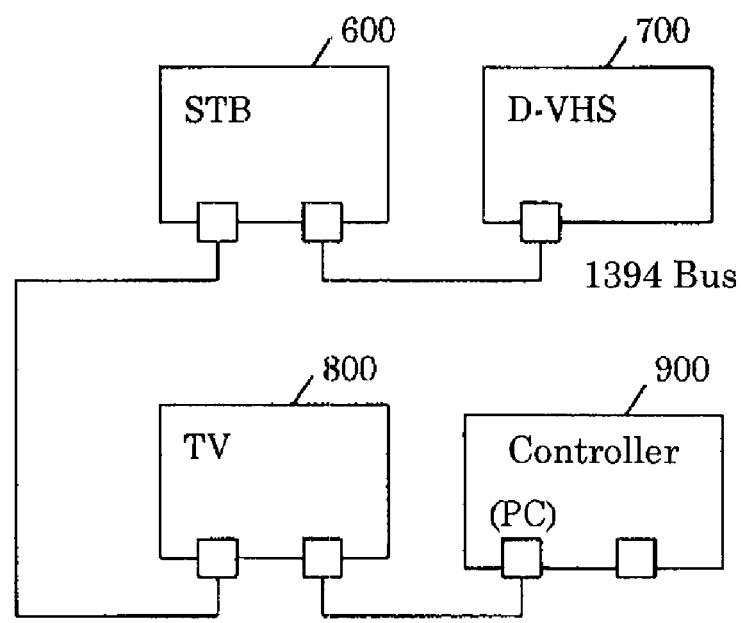
FIG. 36 shows a configuration of a system operating by IEEE1394 interface in the prior art.

Referring to FIG. 30, a device control method in this embodiment of the invention in a system configuration shown in FIG. 35 is explained.

As shown in FIG. 30, a point-to-point (P-to-P) connection is established between VTR 1 and STB 3. At this time, method of cutting off the point-to-point connection by other units than the VTR 1 is not specified. The following is a method of cutting off the point-to-point connection by other units than the VTR 1 and connecting anew.

(1) Herein, if a controller such as PC not shown in the drawing desires to dub from the VTR 2 to the VTR 1, a command is sent to the VTR 2 to "command from the VTR 2 to the VTR 1 for requesting to cut off the point-to-point connection established between the VTR 1 and STB 3, and establish a new point-to-point connection between the VTR 2 and VTR 1", and this command is called INPUT SELECT command.

(2) During such as recording of signal from the STB 3 in the VTR 1 or while using the point-to-point connection established between the VTR 1 and STB 3, a refusal to cut off is sent to the VTR 2 (REJECTED).

(3) If it is all right to cut off the point-to-point connection established between the VTR 1 and STB 3 because the signal from the STB 3 is not recorded in the VTR 1, this command is accepted, and the point-to-point connection established between the VTR 1 and STB 3 is cut off, and a new point-to-point connection is established between the VTR 2 and VTR 1 (ACCEPT).

In this explanation, the point-to-point connection is established between the VTR 1 and STB 3.

If there is no device established in point-to-point connection with the VTR 1, the VTR 1 receiving this command tries to establish a point-to-point connection with the VTR 2.

Point to point connection may fail to be established due to shortage of empty band or channel necessary for connection.

Suppose this point-to-point connection is established by a third party, for example, the STB 3, in the same way as in the case above, a command is issued from the VTR 2 to the VTR 1 to request to cut off the point-to-point connection established between the VTR 1 and STB 3, and establish a new point-to-point connection between the VTR 2 and VTR 1.

However, the VTR 1 cannot cut off the point-to-point connection established by other devices, and a refusal is sent to the VTR 2 (REJECTED).

These are examples of sending the command from the controller to the VTR 1, but the VTR 2 itself can also send a command to the VTR 1 if desired to dub from itself to the VTR 1.

FIG. 31 shows the contents of INPUT SELECT command in an example of the invention.

As shown in FIG. 33, the plug field specifies a plug for establishing a point-to-point connection.

As shown in FIG. 32, the level field shows the level of forcing to establish connection, depending on the state of the unit for receiving the command, such as the state of having already received the signal.

The status field always has an FF (hexadecimal) value in the command. The contents of the status field in the response to the command are shown in FIG. 34. As shown in FIG. 32 and FIG. 34, the status field in the response shows the contents of the connection actually made or the reason of rejection, to the request shown in the level field of the command.

In the row including "return" in FIG. 34, "rejected*" means rejection is always made in each condition shown by "meaning."

In the command in FIG. 31, the input_type field shows to designate the isochronous channel number used in connection, or to consign to the unit receiving the command without designating. The contents of the input_type field are shown in FIG. 33.

The connected node_ID field of the command has the information for designating the unit as the object of connection, herein, the node ID value. The unit receiving this command designates the unit to be connected in this connected node_ID field.

This field is not necessary if specified to establish connection with the unit transmitting the command.

The connected plug_ID field of the command has the information for specifying the plug in the unit as the object of connection, herein, the plug number. The unit receiving the command designates to establish connection with which plug in the unit as the object of connection in this connected plug_ID field.

As explained herein, by newly providing the INPUT SELECT command for requesting the reception side to establish point-to-point connection, the reception side can always establish a point-to-point connection even if the transmission side or third party wishes to establish connection.

Thus, the connection no longer necessary at the reception side can be cut off.

If not necessary at the transmission side, by continuously sending Empty Packet, the reception side knows invalid transmission, and cuts off the connection.

This realizes a device control method capable of efficiently controlling connection of units connected to a bus.

In the embodiment, by continuously sending Empty Packet, the reception side knows invalid transmission, and cuts off the connection. Alternatively, by sending the transmission stopping note from the transmission side, the reception side can cut off connection by receiving it.

Not depending on the third party unit such as controller, it is also possible to set by an arbitrary unit connected to the IEEE1394 bus.

In these embodiments of the invention, the device control method of the invention is explained. As the recording medium of the invention, any recording medium recording a program for executing whole or part of the steps of the device control method by the computer may be used.

INDUSTRIAL APPLICABILITY

As clear from the explanation herein, according to the invention, the input source of signal can be immediately known and controlled by omitting the procedure of closely inspecting the connection state inside of devices connected to a bus. Further, by newly providing a command for requesting establishment of point-to-point connection to the reception side, the reception side can always establish a point-to-point connection even if the transmission side or the third party wishes to establish connection.

Thus, the device control method capable of efficiently controlling connection of units connected on the bus and the program recording medium are obtained.

REFERENCE NUMERALS IN THE DRAWINGS

100 D-VHS
700 D-VHS
700a D-VHS
700b D-VHS
750 D-VHS
101 Digital input plug
201 Digital input plug
201a Digital input plug
201b Digital input plug
201c Digital input plug
422 Digital input plug
102 Digital output plug
102a Digital output plug
102b Digital output plug
401 Digital output plug
701a Digital output plug
701b Digital output plug
110 VCR
710 VCR
710a VCR
710b VCR
111 Destination plug
211 Destination plug
221 Destination plug
411 Destination plug
411a Destination plug
411b Destination plug
710a Destination plug
710b Destination plug
711 Destination plug
112 Source plug 121 Source plug
232 Source plug
412 Source plug
712 Source plug
721a Source plug
721b Source plug
120 Tuner
220 Tuner
410 Tuner
610 Tuner
720 Tuner
720a Tuner
720b Tuner
200 TV
800 TV
202 External input plug
403 External input plug
404 External input plug
420 External input plug
210 Monitor
810 Monitor
230 Satellite broadcast reception antenna
420 Satellite broadcast reception antenna
300 IEEE1394 bus
900 IEEE1394 bus
400 STB
600 STB
402 External output plug
421 Satellite communication antenna
500 Analog video/audio signal cable
10 D-VHS
20 TV
30 STB
40 IEEE139bus
50 Analog video/audio signal cable
210 Monitor
211 Destination plug
301 Digital output plug
302 Destination plug
310 Tuner
6 Camcoder
1 VTR1
2 VTR2
3 STB
4 Monitor
5 Controller
252 Path
254 Path
256 Path
258 Path
260 Path
262 Path
264 Path
266 Path
268 Path
270 Path
272 Path
280 Virtual output path
852 The same contents as command
854 Response to signal source
856 Response to output
952 The same contents as command
954 Response to signal source
956 Response to output
1052 The same contents as command
1054 Response to signal source
1056 Response to output
1058 The same contents as command
1060 Response to signal source
1062 Response to output
1152 The same contents as command
1154 Response to signal source
1156 Response to output
1158 The same contents as command
1160 Response to signal source
1162 Response to output
1252 The same contents as command
1254 Response to signal source
1256 Response to output
1258 The same contents as command
1260 Response to signal source
1262 Response to output
1352 Response to signal source
1354 Inquiry to output
1356 Response to signal source
1358 Response to output
1452 Inquiry to signal source
1454 Inquiry to output
1456 Response to signal source
1458 Response to output
1652 The same contents as command
1654 Response to output
1656 Response to signal source
1752 The same contents as command
1754 Response to output
1756 Response to signal source
1852 The same contents as command
1854 Response to output
1856 Response to signal source
1952 Response to output
1954 Response to signal source
2052 Response to output
2054 Response to signal source

The invention claimed is:

1. A device control method in a system comprising
a) a plurality of units connected to a bus, each unit including at least one of an input plug connected to the bus for inputting an input signal to the unit from the bus and an output plug connected to the bus for outputting an output signal to the bus from the unit, and
b) a subunit included in the unit, the subunit connected to the bus through the unit and having at least one of a destination plug connected to the input plug for inputting a destination signal to the subunit from the bus and a source plug connected to the output plug for outputting a source signal to the bus, said method comprising the steps of:
a) signaling a command to a first unit connected to the bus for inquiring a status of the input plug or signaling the command to the subunit included in the first unit for inquiring a status of the source plug; and
b) receiving a single of a response to the command provided by the first unit signaled in step a) or the subunit signaled in step a),
wherein the response includes information indicating that a virtual signal output is virtually input into the first unit while the first unit actually receives a signal from the bus, and the information further indicates that the virtual signal output is virtually received from a second unit connected to the bus.

2. The device control method of claim 1, wherein
the information further indicates that the virtual signal output is virtually output to the bus from the second unit.

3. The device control method of claim 2, further comprising the steps of:

c) detecting that the second unit outputs another information indicating that an output plug of the second unit virtually outputs the virtual signal output to the bus, by a response to a command for inquiring a state of the output plug of the second unit;

d) detecting that the second unit receives the signal via the bus from a third unit connected to the bus, by a response to a command for inquiring a state of an input plug of the second unit; and e) after steps of a), b), c), and d), making the first unit function as receiving the virtual signal output from the third unit via the second unit.

4. The device control method of claim 1, further comprising the step of:

c) determining whether or not a further subunit is present along a path from the output plug or along a path from the source plug based on another command and a response to the another command.

5. The device control method of claim 1, further comprising the step of:

c) determining whether or not the output signal is processed along a path from the output plug or whether or not the source signal processed along a path from the source plug based on another command and a response to the another command.

6. The device control method of claim 5, further comprising the steps of:

d) determining whether or not the signal is a multiplexed signal having multiple program contents, and e) determining whether or not
   1) there is the output signal along the path from the output plug or the source signal along the path from the source plug and
   2) part of the multiplexed signal has been extracted along the path from the output plug or along the path from the source plug as the result of the detection provided by the input plug of the unit or the destination plug of the subunit.

7. The device control method of claim 5, further comprising the steps of:

d) determining whether the output signal or source signal includes video data, and e) determining whether or not data is added to the video data of the output signal along the path from the output plug or added to the video data of the source signal along the path from the source plug to display contents other than the video data of the output signal or source signal as the result of the detection provided by the input plug of the unit or the destination plug of the subunit.

8. The device control method of claim 3, wherein the first unit and the second unit receive the signal output from the third unit via the bus.

* * * * *